United States Patent
Inukai

(10) Patent No.: US 8,491,203 B2
(45) Date of Patent: Jul. 23, 2013

(54) SHUTTER DEVICE

(75) Inventor: Hiroaki Inukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/304,240

(22) Filed: Nov. 23, 2011

(65) Prior Publication Data

US 2012/0141113 A1  Jun. 7, 2012

(30) Foreign Application Priority Data

Dec. 1, 2010 (JP) ................................ 2010-268751

(51) Int. Cl.
- *G03B 19/12* (2006.01)
- *G03B 9/08* (2006.01)
- *G03B 9/58* (2006.01)
- *G03B 17/38* (2006.01)

(52) U.S. Cl.
USPC ........... 396/357; 396/452; 396/463; 396/470; 396/478; 396/502

(58) Field of Classification Search
USPC ................. 396/358, 354, 357, 452, 502, 463, 396/470, 478
See application file for complete search history.

(56) References Cited

U.S. PATENT DOCUMENTS

| | | |
|---|---|---|
| 2002/0006285 A1 | 1/2002 | Takahashi |
| 2005/0207750 A1 | 9/2005 | Hirota |
| 2008/0175583 A1 | 7/2008 | Seita |
| 2009/0028545 A1 | 1/2009 | Sakai |
| 2010/0290776 A1 | 11/2010 | Misawa |
| 2012/0141106 A1 | 6/2012 | Inukai |
| 2012/0141107 A1 | 6/2012 | Inukai |

FOREIGN PATENT DOCUMENTS

| | | |
|---|---|---|
| JP | 2000-131731 A | 5/2000 |
| JP | 2008-180815 A | 8/2008 |
| JP | 2009-031513 A | 2/2009 |

*Primary Examiner* — Rochelle-Ann J Blackman
(74) *Attorney, Agent, or Firm* — Canon USA Inc IP Division

(57) ABSTRACT

A shutter base plate is formed with a first shaft parallel to an optical axis of a photographic light flux, and a blade lever rotates about the first shaft to drive a first blade and a second blade. A drive lever rotates about the first shaft to drive the blade lever. A second cam gear rotates about a second shaft formed on the shutter base plate in parallel to the first shaft to charge a mirror drive spring. A first cam gear rotates about a third shaft formed on the shutter base plate in parallel to the first shaft to switch between a state in which the blade lever is held so that the first blade and the second blade close the aperture and a state in which holding of the blade lever is released.

9 Claims, 24 Drawing Sheets

SECTION A-A

SECTION B

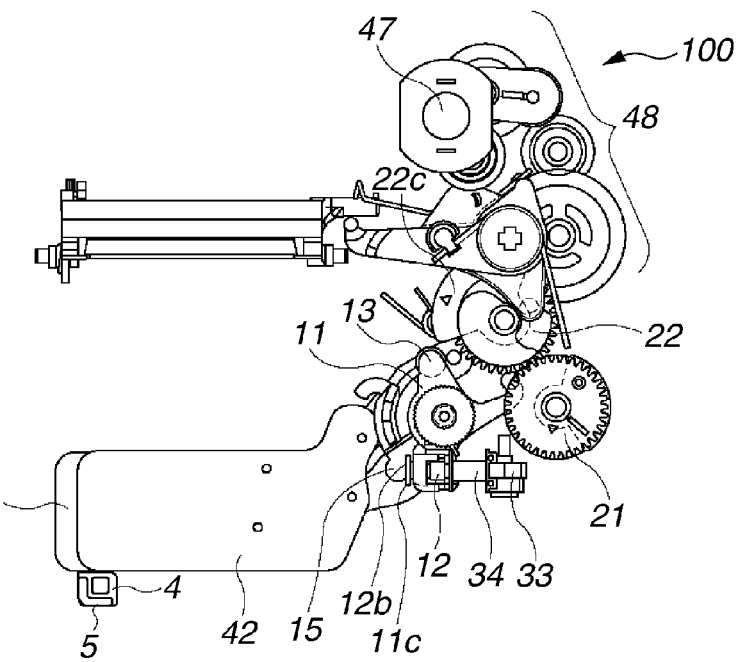
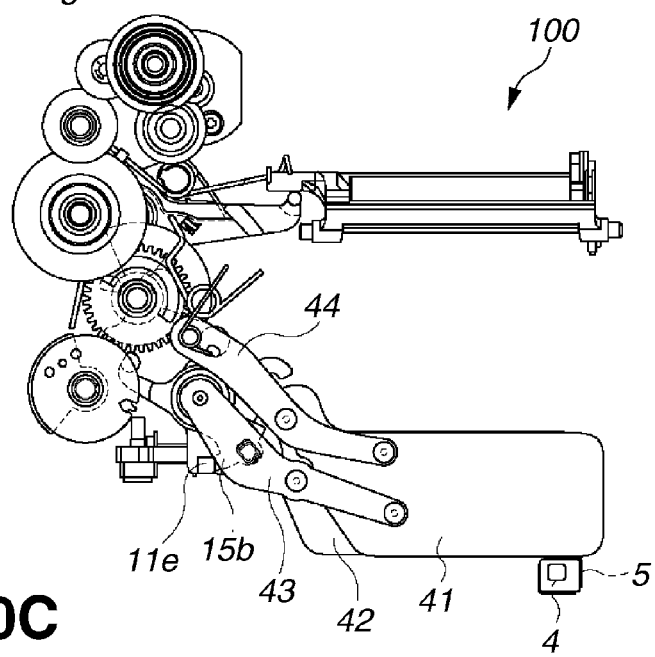
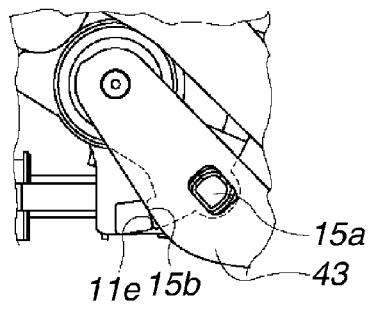
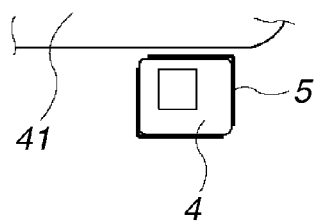

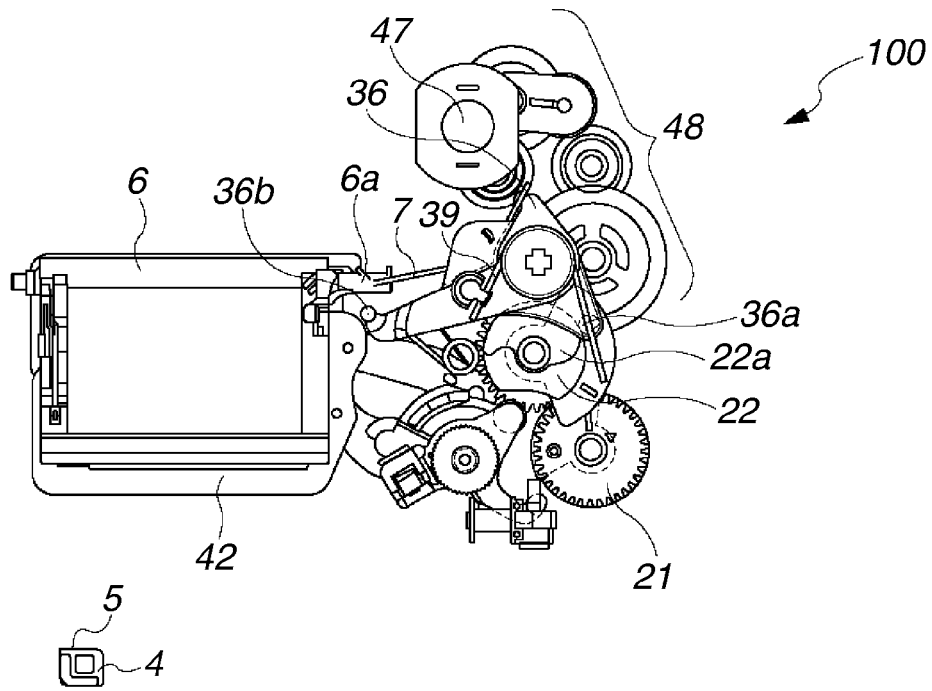
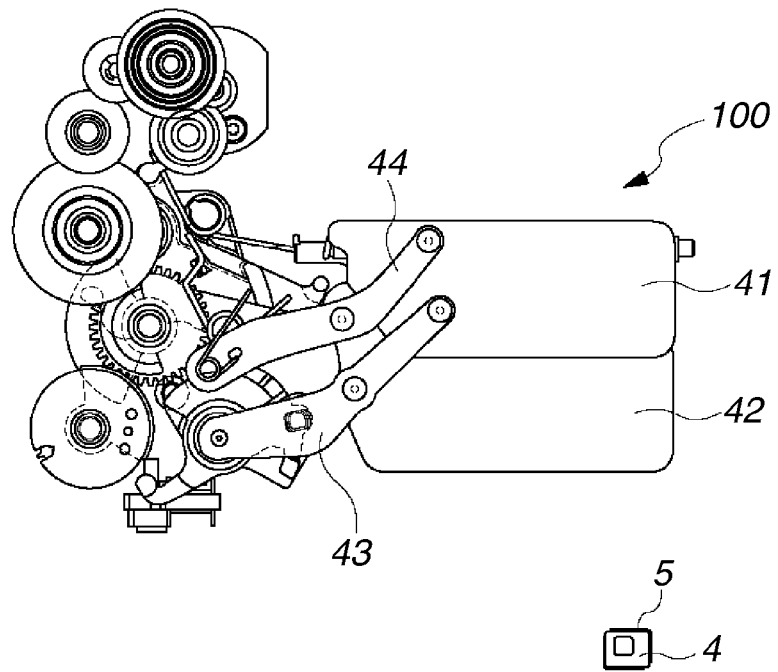

FIG.20A
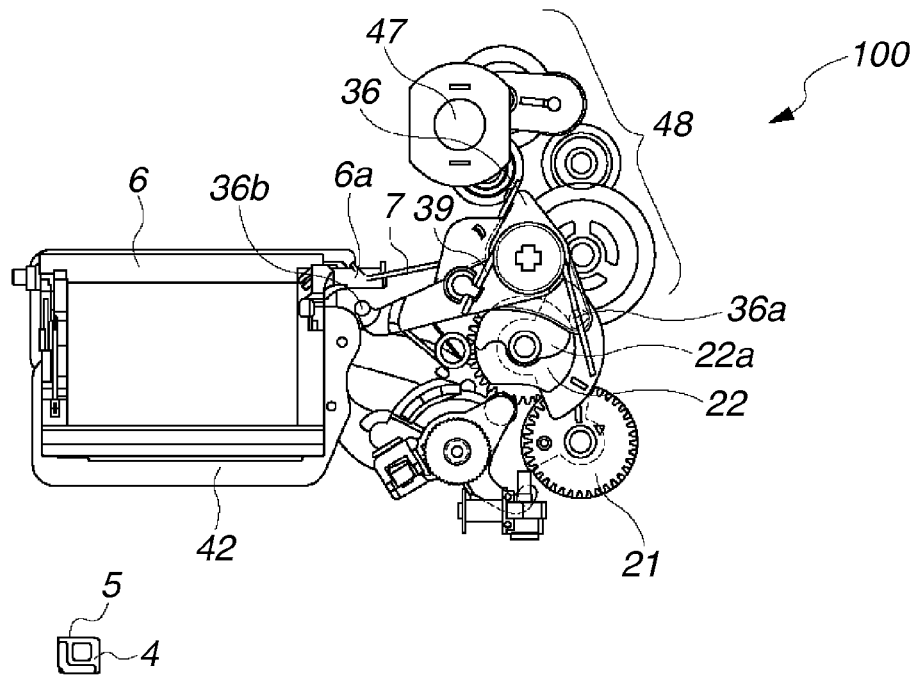
FIG.20B
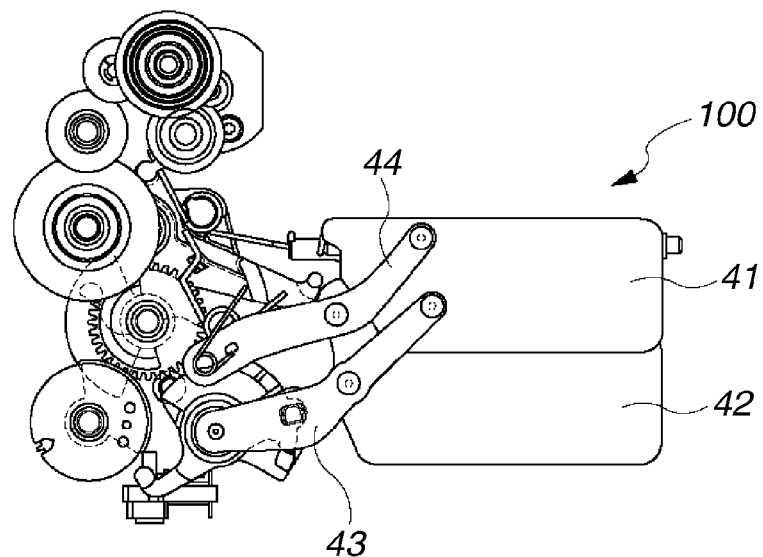

SHUTTER DEVICE

BACKGROUND OF THE INVENTION

1. Field of the Invention

The present invention relates to a shutter device.

2. Description of the Related Art

Japanese Patent Application Laid-Open No. 2008-180815 discusses an imaging apparatus that performs an image capturing operation using not only a focal plane shutter but also an electronic shutter. The imaging apparatus starts an exposure operation using an electronic shutter function of an image sensor, and terminates the exposure operation by running a blade group constituted by a mechanical shutter.

In this shutter device, a drive lever is held by energizing an electromagnet, and thereafter, a set lever starts driving a mirror upward. After the mirror is moved upward, engagement of a blade lever is released, whereby the blade group makes an aperture open. Then, at predetermined timing, the electromagnet is de-energized, so that the drive lever and the blade lever are driven together in a direction to close the aperture.

In the shutter device discussed in Japanese Patent Application Laid-Open No. 2008-180815, the set lever rotates about an axis perpendicular to a photographic optical axis (so moves in a plane orthogonal to the light receiving face of the image sensor), whereby engagement of the blade lever is released. The set lever is caused to rotate by a drive source such as a motor, whereby a charge lever rotates to charge a drive spring for driving the drive lever.

However, since the set lever rotates about an axis perpendicular to the photographic optical axis, there is an issue in that when the set lever is provided in the shutter device, the size of the shutter device increases.

Moreover, when an output shaft of the drive source such as a motor is arranged in parallel to the photographic optical axis, it is necessary to change the drive direction to drive the set lever. However, when the drive direction is changed, there is an issue in that the loss of the drive force increases.

SUMMARY OF THE INVENTION

According to an aspect of the present invention, a shutter device includes a shutter plate formed with an aperture through which a photographic light flux passes, a shutter blade configured to close and open the aperture, a blade lever coupled with the shutter blade, a blade return spring configured to urge the blade lever in a direction in which the shutter blade opens the aperture, a drive lever configured to drive the blade lever, a blade drive spring configured to urge the drive lever, a charge cam member configured to charge the blade drive spring, the charge cam member having a charge cam portion formed thereon, wherein the charge cam portion comes into contact with the drive lever, and a hold cam member having a hold cam portion formed thereon, wherein the hold cam portion comes into contact with the blade lever to hold the blade lever so that the shutter blade closes the aperture, wherein the shutter plate is formed with a first shaft parallel to an optical axis of the photographic light flux, wherein the blade lever is arranged to rotate about the first shaft to drive the shutter blade, wherein the drive lever is arranged to rotate about the first shaft to drive the blade lever, wherein the charge cam member is arranged to rotate about a second shaft, formed on the shutter plate in parallel to the first shaft, to charge the blade drive spring, and wherein the hold cam member is arranged to rotate about a third shaft, formed on the shutter plate in parallel to the first shaft, to switch between a state in which the blade lever is held so that the shutter blade closes the aperture and a state in which holding of the blade lever is released.

According to an exemplary embodiment of the present invention, a shutter device having a preferred size can be provided (e.g. without increasing the size of the shutter device), in which it is not necessary to change a drive direction when an output shaft of a drive source is arranged in parallel to a photographic optical axis.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A to 10D are diagrams illustrating a state of the shutter unit in a set release state.

FIGS. 15A and 15B are diagrams illustrating a state of the shutter unit in a mirror lever charge completion state.

FIGS. 20A and 20B are diagrams illustrating a state of the shutter unit in a mirror lever charge completion state.

DESCRIPTION OF THE EMBODIMENTS

Various exemplary embodiments, features, and aspects of the invention will be described in detail below with reference to the drawings.

A shutter device and an imaging apparatus including the shutter device according to an exemplary embodiment of the present invention will be hereinafter described with reference to FIGS. 1A and 1B to FIG. 24.

Figure 24:
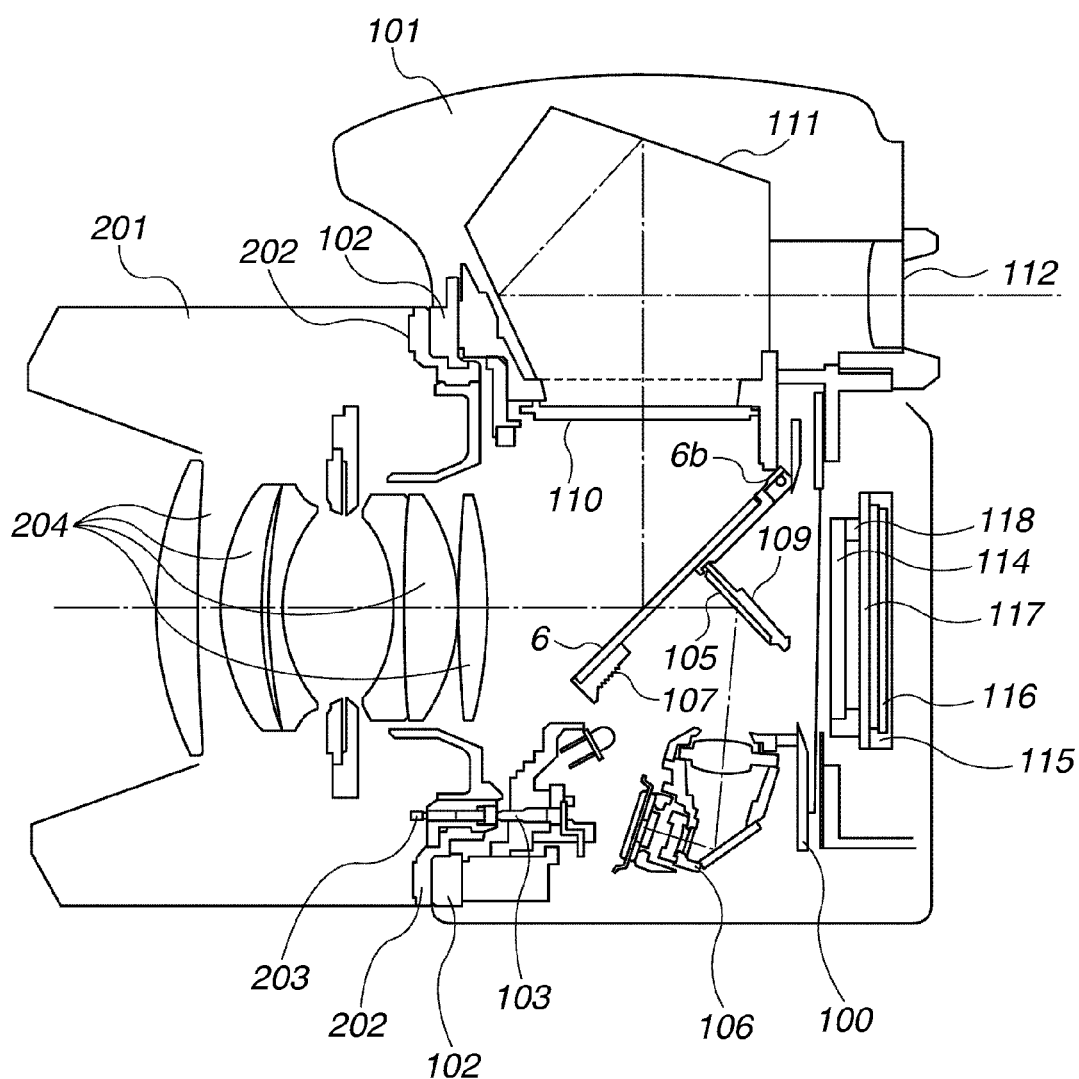
FIG. 24 is a central cross sectional view illustrating a digital single-lens reflex camera body serving as an imaging apparatus according to an exemplary embodiment of the present invention and an interchangeable lens.

FIG. 24 is a central cross sectional view illustrating a digital single-lens reflex camera body 101 serving as an imaging apparatus according to an exemplary embodiment of the present invention and an interchangeable lens 201.

The interchangeable lens 201, which can be detachably attached to the camera body 101, is fixed by a mount unit 102 provided on the camera body 101 and a mount unit 202 provided on the interchangeable lens 201. When the interchangeable lens 201 is attached, a contact portion 103 of the camera body 101 is electrically connected to a contact portion 203 of the interchangeable lens 201. Therefore, the camera body 101 detects that the interchangeable lens 201 is attached.

Further, power is supplied from the camera body 101 to the interchangeable lens 201 via the contact portions 103 and 203, and communication for controlling the interchangeable lens 201 is transmitted via the contact portions 103 and 203. A light flux having passed through a focusing lens 204 of the interchangeable lens 201 is incident upon a main mirror 6 of the camera body 101. The main mirror 6 is a mirror that can move back and forth in a photographic optical path. The main mirror 6 is a half mirror, and the light flux reflected by the main mirror 6 is guided to a viewfinder.

A light flux having passed through the main mirror 6 is reflected downward by a sub-mirror 105, and is guided to a focus detection unit 106. The focus detection unit 106 detects the amount of defocus of the focusing lens 204, and calculates the amount of lens drive for which the focusing lens 204 is moved to attain a focused state of the focusing lens 204. Then, when the calculated amount of lens drive is transmitted to the interchangeable lens 201 via the contact portions 103 and 203, the interchangeable lens 201 controls a motor, not illustrated, thereby moving the focusing lens 204 and adjusting the focus.

The main mirror 6 is held in a main mirror holding frame 107, and the main mirror 6 is rotatably supported by a rotating shaft portion 6b. The sub-mirror 105 is held by a sub-mirror holding frame 109. The sub-mirror holding frame 109 is rotatably supported by a hinge shaft, not illustrated, with respect to the main mirror holding frame 107. The light flux guided to the viewfinder by the main mirror 6 forms an object image on a focusing screen 110. The imaging apparatus is configured such that a user can observe an object image on the focusing screen 110 via a pentagonal prism 111 and an eyepiece lens 112.

A shutter unit 100 is provided behind the sub-mirror 105, and the blade group is closed in a normal state. An optical low-pass filter 114 is arranged behind the shutter unit 100. Behind the optical low-pass filter 114, an image sensor 116 and a cover member 117 are provided. The image sensor 116 is held by an image sensor holder 115 fixed to the housing with screws, not illustrated. The cover member 117 protects the image sensor 116. A rubber member 118 holds the optical low-pass filter 114 and seals a portion between the optical low-pass filter 114 and the image sensor 116. The imaging apparatus is configured such that during a shooting operation, the light flux having passed through the optical low-pass filter 114 is incident upon the image sensor 116.

Figure 1A:
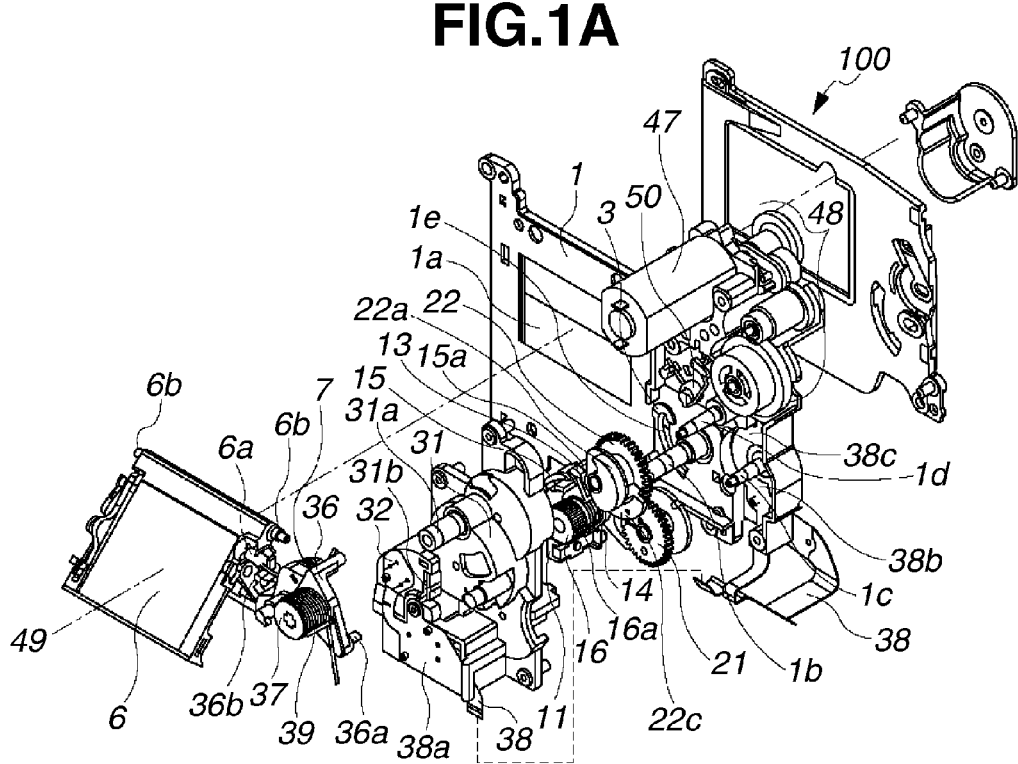
FIGS. 1A and 1B are exploded perspective views illustrating a shutter unit.
Figure 1B:
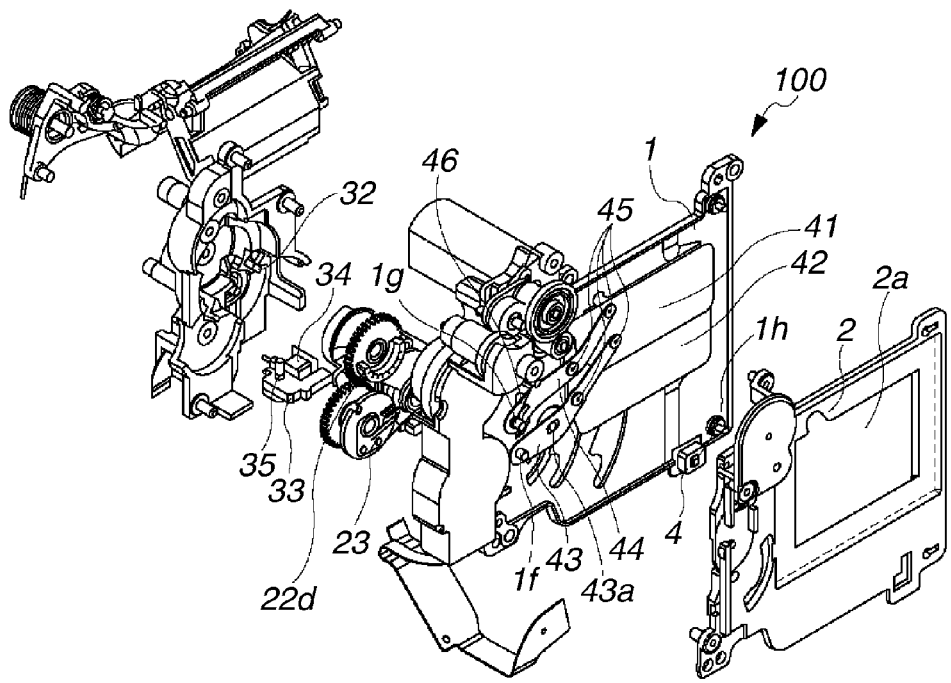

FIG. 1A is an exploded perspective view illustrating the shutter unit 100 as viewed from a front thereof. FIG. 1B is an exploded perspective view illustrating the shutter unit 100 as viewed from a back thereof.

As illustrated in FIG. 1A, an aperture 1a is formed in a central portion of the shutter base plate (shutter plate) 1. An optical axis 49 passes through the center of the aperture 1a. A shaft 1b, a shaft 1c, and a shaft 1d, which are parallel to the optical axis 49, are formed on the shutter base plate 1. A drive lever 11 and a ratchet 16 are rotatably supported by the shaft 1b. A blade lever 15 is supported by the drive lever 11, and rotates around the shaft 1b, which is the rotational axis of the drive lever 11. A first cam gear 21 is rotatably supported by the shaft 1c. A second cam gear 22 is rotatably supported by the shaft 1d. The shaft 1b functions as a first shaft, the shaft 1c functions as a third shaft, and the shaft 1d functions as a second shaft.

The shaft 1b, the shaft 1c, and the shaft 1d are formed to be in parallel to the optical axis 49. Accordingly, the shaft 1c and the shaft 1d are parallel to the shaft 1b. The first cam gear 21 functions as a hold cam member, and the second cam gear 22 functions as a charge cam member.

Drive force provided by a motor 47 having an output shaft parallel to the optical axis 49 is transmitted to the second cam gear 22 via a plurality of reduction gear trains 48 having rotational shafts parallel to the optical axis 49.

A first cam 22a, which comes into contact with a cam follower 36a of a mirror lever 36, described below, is provided on the second cam gear 22. A second cam 22c, which comes into contact with a roller 13 provided on the drive lever 11, is formed on the second cam gear 22. The second cam 22c functions as a second cam portion. The first cam 22a and the second cam 22c are formed at different portions in a direction of the shaft 1d of the second cam gear 22 (third shaft direction). The second cam 22c is located closer to the shutter base plate 1 than the first cam 22a.

Further, a third cam 22d, which comes into contact with a cam gear control spring 50 for controlling rotation of the second cam gear 22, is formed on the second cam gear 22. The third cam 22d is located closer to the shutter base plate 1 than the second cam 22c. In other words, the cam gear control spring 50 functions a rotation control spring for suppressing rotation of the second cam gear 22 according to the rotational position of the second cam gear 22. The third cam 22d, which functions as a control cam portion, and is located closer to the shutter base plate 1 than the second cam 22c, which functions as the charge cam portion.

The drive lever 11 and the ratchet 16 are pivotally supported by the shaft 1b, the first cam gear 21 is pivotally supported by the shaft 1c, and the second cam gear 22 is pivotally supported by the shaft 1d, whereby an auxiliary base plate (auxiliary plate) 31 is fixed to the shutter base plate 1. The blade lever 15 is pivotally supported by the drive lever 11, and rotates around the shaft 1b like the drive lever 11. In the auxiliary base plate 31, shaft receiving holes are formed. The shaft 1b, the shaft 1c, and the shaft 1d are respectively inserted into the shaft receiving holes. The drive lever 11, the blade lever 15, the ratchet 16, the first cam gear 21, and the second cam gear 22 are sandwiched between the shutter base plate 1 and the auxiliary base plate 31.

A shaft 31a is formed on the auxiliary base plate 31. The mirror lever 36 is rotatably supported by the shaft 31a. The shaft 31a is also formed parallel to the optical axis 49. Accordingly, the shaft 31a is parallel to the shaft 1b.

After the mirror lever 36 is installed to be pivottaly supported by the shaft 31a, a screw 37 is screwed into an end of the shaft 31a of the auxiliary base plate 31. The screw 37 fixes the mirror lever 36 to the shaft 31a in such a manner that the mirror lever 36 can rotate with respect to the shaft 31a.

The cam follower 36a is provided on the mirror lever 36, and comes into contact with the first cam 22a of the second cam gear 22. A contact portion 36b is formed on the mirror lever 36, and comes into contact with a shaft portion 6a of the main mirror 6. A mirror lever drive spring 39 is put on the mirror lever 36. The mirror lever drive spring 39 urges the mirror lever 36 in a clockwise direction in FIG. 1A, i.e., a direction in which the main mirror 6 is raised.

The main mirror 6 reciprocally rotates around the rotating shaft portion 6b. As a result, the main mirror 6 can be at a lower position where the main mirror 6 is held at an angle of 45 degrees with respect to the optical axis 49 to guide a photographic light flux to the pentagonal prism 111 and an upper position where the main mirror 6 is retracted out of the photographic light flux to guide the photographic light flux to the image sensor 116.

Further, a mirror drive spring 7 is attached to the mirror lever 36. An end portion of the mirror drive spring 7 is put on the shaft portion 6a of the main mirror 6. Accordingly, the main mirror drive spring 7 urges the main mirror 6 downward.

Ratchet teeth 16a are formed on the ratchet 16. An engaging claw portion 31b serving as an engaging member that engages the ratchet teeth 16a is formed on the auxiliary base plate 31.

A photo-sensor 32 for detecting the rotational position of the blade lever 15 is attached to the auxiliary base plate 31

As illustrated in FIG. 1B, a yoke 33 and a coil 34 are fixed to the auxiliary base plate 31 by a screw 35. When a voltage is applied to the coil 34, magnetic force is generated in the yoke 33.

As illustrated in FIG. 1A, a first fixed portion 38a and a second fixed portion 38b are formed on a flexible wiring board 38. The first fixed portion 38a is fixed to the auxiliary base plate 31. The second fixed portion 38b is fixed to the shutter base plate 1. The flexible wiring board 38 is connected to the coil 34 and the photo-sensor 32 with the first fixed portion 38a. A phase pattern portion 38c for detecting a phase of a phase contact piece 23 attached to the first cam gear 21 is formed on the second fixed portion 38b of the flexible wiring board 38.

A semilunar cushioning member 3 made of an elastic member such as rubber is fixed to an upper portion of an arc-shaped hole 1e of the shutter base plate 1.

As illustrated in FIG. 1B, a cover plate 2 is fixed to a back surface side of the shutter base plate 1. An aperture 2a is formed in a central portion of the cover plate 2. The aperture 2a is formed at substantially the same position as the aperture 1a of the shutter base plate 1. The apertures 1a and 2a limit a light flux passing through the shutter unit 100.

A blade chamber for accommodating the blade group is formed between the shutter base plate 1 and the cover plate 2.

The blade group includes a first blade 41, a second blade 42, a main arm 43, and a sub-arm 44.

The first blade 41 and the second blade 42 serving as the shutter blade are made of polyethylene terephthalate including blackening. The first blade 41 is rotatably supported by the main arm 43 and the sub-arm 44 with pins 45. The second blade 42 is rotatably supported by the main arm 43 and the sub-arm 44 with the pins 45.

The main arm 43 is rotatably supported by a shaft 1f formed on the shutter base plate 1. The sub-arm 44 is rotatably supported by a shaft 1g formed on the shutter base plate 1. The main arm 43 rotates around the shaft 1f, and the sub-arm 44 rotates around the shaft 1g, so that the first blade 41 and the second blade 42 perform parallel link motion.

A hole 43a for engaging with an engaging portion 15a of the blade lever 15, described below, is formed in the main arm 43. The blade lever 15 functions as a blade lever that couples with the first blade 41 and the second blade 42. A blade return spring 46 is put on the sub-arm 44. The blade return spring 46 urges the sub-arm 44 in the clockwise direction in FIG. 1B. That is, the urging force applied by the blade return spring 46 causes the first blade 41 and the second blade 42 to run in a direction to open the apertures 1a and 2a.

When the first blade 41 and the second blade 42 finish running in the direction to open the apertures 1a and 2a with the urging force applied by the blade return spring 46, the first blade 41 and the second blade 42 collide with a blade cushioning member 4. The blade cushioning member 4 is fixed to a rectangular shaft portion 1h arranged on the shutter base plate 1. The blade cushioning member 4 has a rectangular external shape. The shaft portion 1h is also formed in the same rectangular shape as the external shape of the blade cushioning member 4. A side of the external shape of the blade cushioning member 4 is formed to be substantially parallel to a side of the shaft portion 1h while the blade cushioning member 4 is attached to the shutter base plate 1. In the present exemplary embodiment, the blade cushioning member 4 and the shaft portion 1h are in the rectangular shapes, but the same actions and effects can be achieved as long as they are in polygonal shapes that satisfy the above conditions.

The blade cushioning member 4 is made of a material absorbing shock, e.g., rubber material such as chloroprene rubber, butyl rubber, polyurethane rubber, and silicone rubber, or elastomer. A periphery of the blade cushioning member 4 is covered with a blade contact member 5. The blade contact member 5 is made of a material having higher degree of resistance to abrasion than the blade cushioning member 4, such as metal and plastic. The blade contact member 5 is fixed to the blade cushioning member 4. When the first blade 41 and the second blade 42 collide with the blade cushioning member 4, the first blade 41 and the second blade 42 are configured not to be in direct contact with the blade cushioning member 4. In this configuration, when the first blade 41 and the second blade 42 collide with the blade cushioning member 4, the blade cushioning member 4 is prevented from abrasion.

Figure 2A:
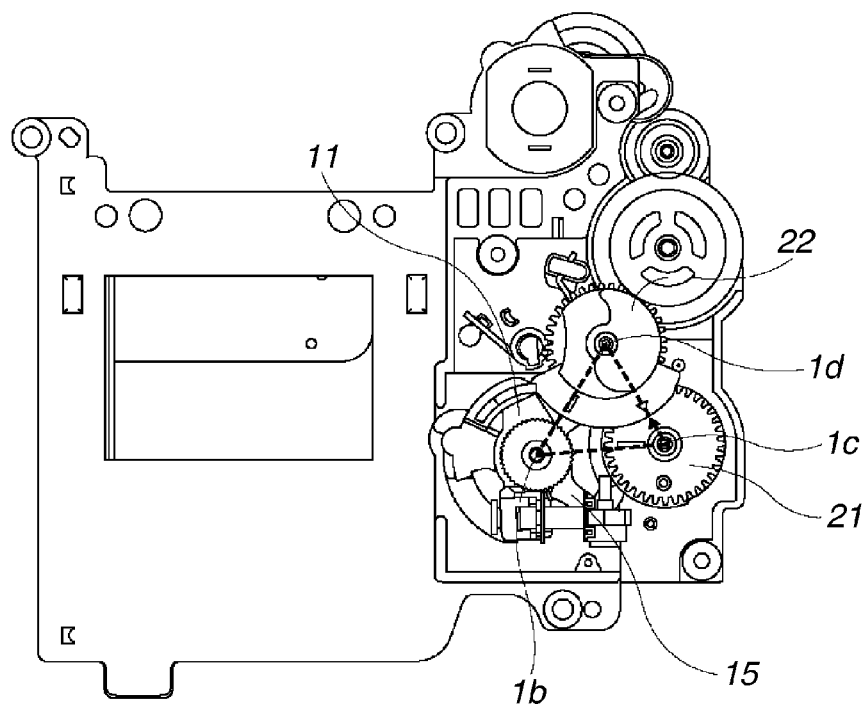
FIGS. 2A and 2B are diagrams illustrating the shutter unit.
Figure 2B:
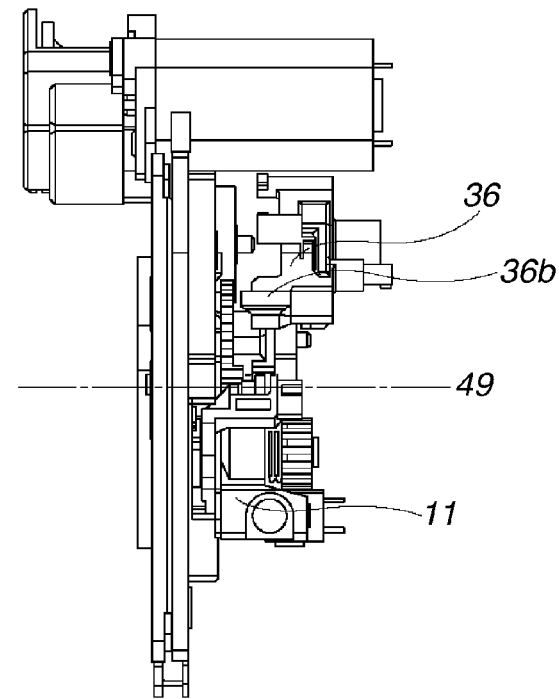

FIG. 2A is a diagram illustrating the shutter unit 100 as viewed from a front thereof. FIG. 2B is a diagram illustrating the shutter unit 100 as viewed from a side thereof.

As illustrated in the figures, the shaft 1c serving as the center of rotation of the first cam gear 21 provided on the shutter base plate 1 is formed at a position opposite to the optical axis 49 with respect to a line connecting between the shaft 1b serving as the center of rotation of the drive lever 11 and the blade lever 15 and the shaft 1d serving as the center of rotation of the second cam gear 22. The shaft 1b, the shaft 1c, and the shaft 1d are formed such that a triangle formed by connecting the shaft 1b, the shaft 1c, and the shaft 1d (indicated by a broken line) becomes an acute-angled triangle. This can reduce the size of the shutter drive unit.

As illustrated in FIG. 2B, the contact portion 36b of the mirror lever 36 is located at an upper side in the figure with respect to the optical axis 49. The drive lever 11 is located at a lower side in the figure with respect to the optical axis 49. As illustrated in FIG. 2B, the contact portion 36b of the mirror lever 36 and the drive lever 11 are located substantially at the same position in the direction of the optical axis 49. In other words, the contact portion 36b of the mirror lever 36 can be arranged in the space higher than the optical axis 49, and the drive lever 11 can be arranged in the space lower than the optical axis 49. In this configuration, the size of the shutter drive unit can be reduced in the direction of the optical axis 49.

Figure 3:
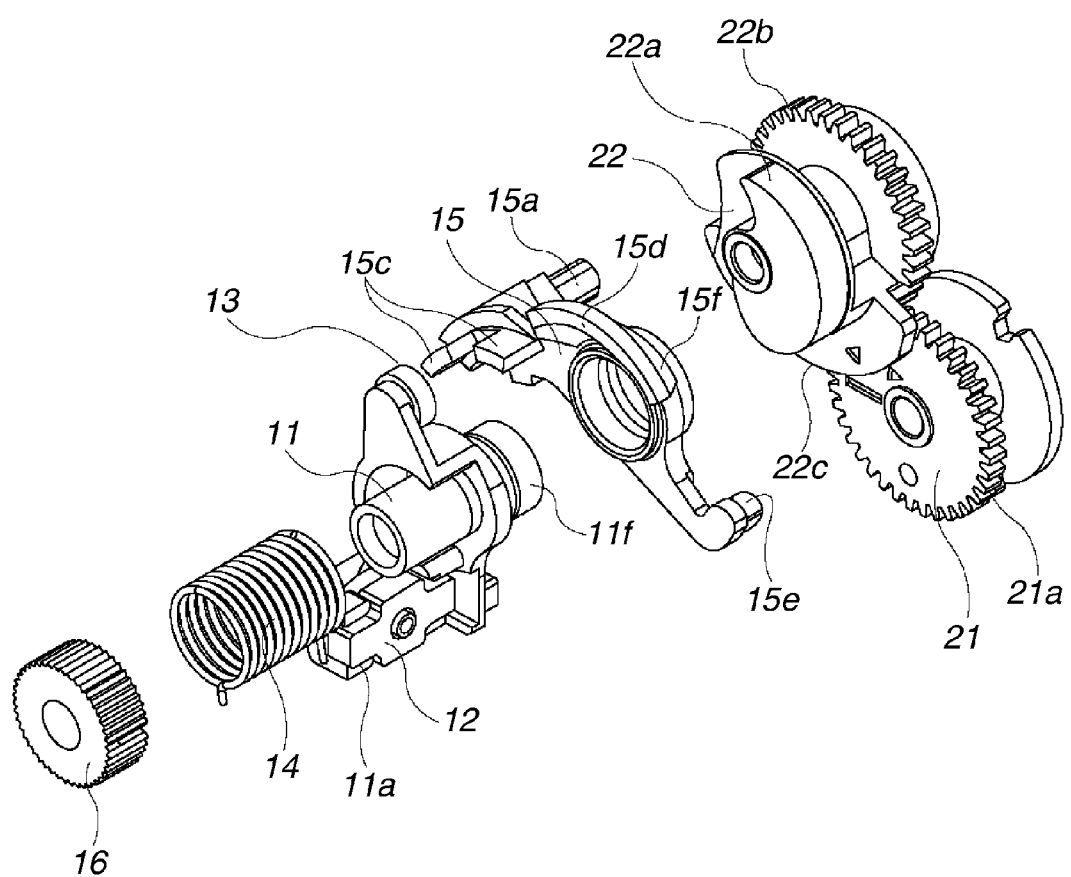
FIG. 3 is an exploded perspective view illustrating a first cam gear, a second cam gear, a blade lever, a drive lever, a blade drive spring, and a ratchet.

FIG. 3 is an exploded perspective view illustrating the first cam gear 21, the second cam gear 22, the blade lever 15, the drive lever 11, a blade drive spring 14, and the ratchet 16. An armature holding portion 11a, a penetrating hole 11b, a protrusion 11c, a roller hold shaft 11d, a protruding portion 11e, and a cylindrical portion 11f are formed on the drive lever 11.

An armature 12 is attached to the armature holding portion 11a. The roller 13 is held by the roller hold shaft 11d.

The engaging portion 15a, a protruding portion 15b, a light-shielding wall portion 15c, a roller receiving portion 15d, a cam follower 15e, and an inclined portion 15f are formed on the blade lever 15.

A gear 21a and a cam 21b are formed on the first cam gear 21. The first cam 22a, a gear 22b, the second cam 22c, and a third cam 22d are formed on the second cam gear 22.

Figure 4A:
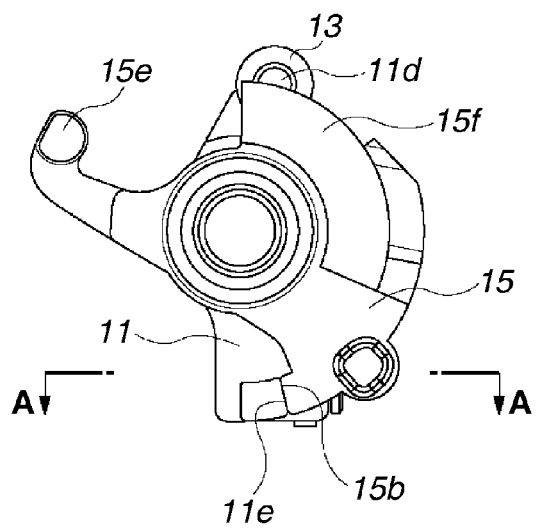
FIGS. 4A to 4D are diagrams illustrating the drive lever, the blade lever, and the ratchet.
Figure 4B:
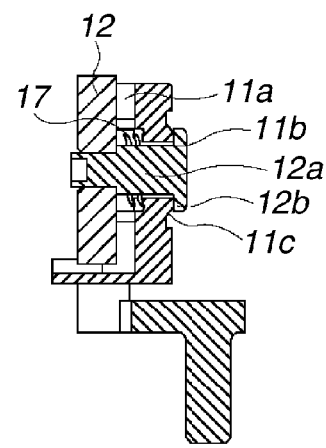
Figure 4C:
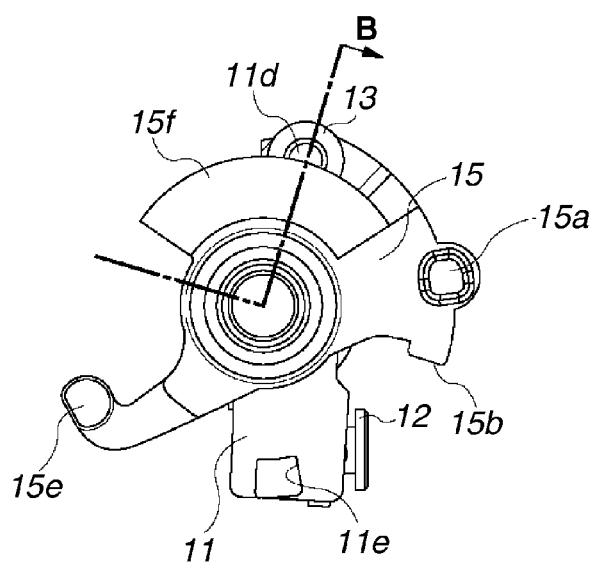

FIGS. 4A to 4D are diagrams illustrating the drive lever 11, the blade lever 15, and the ratchet 16. FIGS. 4A and 4C are diagrams illustrating the drive lever 11, the blade lever 15, and the ratchet 16 as viewed from the shutter base plate 1.

Figure 4D:
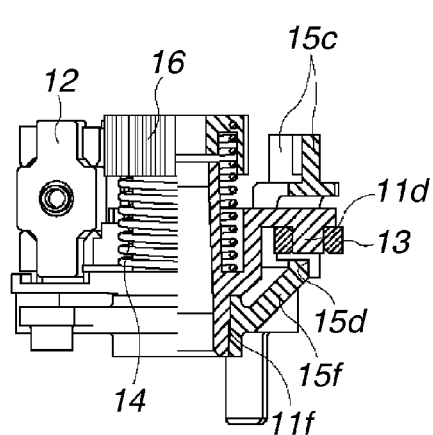

FIG. 4B is a cross sectional view taken along line A-A in FIG. 4A, which is a cross sectional view illustrating the armature holding portion 11a of the drive lever 11. FIG. 4D is a cross sectional view taken along line B-B in FIG. 4C, which is a diagram illustrating a relationship between the roller hold shaft 11d of the drive lever 11 and the roller receiving portion 15d of the blade lever 15.

As illustrated in FIGS. 4A and 4C, the protruding portion 11e is formed on the drive lever 11, and the protruding portion 15b is formed on the blade lever 15. In the state as illustrated in FIG. 4A, the protruding portion 11e is in contact with the protruding portion 15b. In the state as illustrated in FIG. 4C, the protruding portion 11e is not in contact with the protruding portion 15b.

As illustrated in FIG. 4B, the armature holding portion 11a is formed on the drive lever 11. The penetrating hole 11b is formed in the armature holding portion 11a. A flange 12b is provided at an end of an armature shaft 12a. The external diameter of the flange 12b is larger than the internal diameter of the penetrating hole 11b. The other end of the armature shaft 12a is loosely inserted into the penetrating hole 11b. After the armature 12 is attached to the armature shaft 12a, the other end of the armature shaft 12a is crimped.

An armature spring 17, i.e., a compression spring, is arranged around the armature shaft 12a between the armature 12 and the armature holding portion 11a. The armature spring 17 applies urging force in a direction to move the armature 12 away from the armature holding portion 11a.

The hemispheric protrusion 11c is formed at a position facing the flange 12b of the armature holding portion 11a.

As illustrated in FIGS. 4A, 4C, and 4D, the roller 13 is rotatably held in the roller hold shaft 11d of the drive lever 11. Lubricating oil is applied between the roller hold shaft 11d and the roller 13. The roller 13 is in contact with a second cam surface 22c of the second cam gear 22.

The protruding portion 11e is formed on the drive lever 11. The protruding portion 11e is in contact with the protruding portion 15b of the blade lever 15.

The protruding engaging portion 15a is formed on the blade lever 15. The engaging portion 15a penetrates the arc-shaped hole 1e of the shutter base plate 1, and engages with the hole 43a of the main arm 43 at the back surface side of the shutter base plate 1. Accordingly, the main arm 43 rotates in synchronization with the blade lever 15. The cam follower 15e is formed on the blade lever 15. The cam follower 15e comes into contact with a cam surface 21b of the first cam gear 21. Two light-shielding wall portions 15c are provided on the blade lever 15. When the light-shielding wall portion 15c shields light received by the photo-sensor 32, the photo-sensor 32 detects the rotational position of the blade lever 15. In other words, the photo-sensor 32 functions as a detecting unit, and the light-shielding wall portion 15c functions as a portion to be detected.

The roller receiving portion 15d is formed on the blade lever 15. The roller receiving portion 15d extends towards the roller hold shaft 11d, so that the roller 13 held on the roller hold shaft lid does not drop.

The roller receiving portion 15d is formed in a range in which the roller hold shaft lid moves when the blade lever 15 is driven by the urging force of the blade return spring 46 in a direction in which the first blade 41 and the second blade 42 open the apertures 1a and 2a.

Thus, no matter how the drive lever 11 and the blade lever 15 are arranged, the roller receiving portion 15d faces the roller hold shaft 11d. Therefore, even when the lubricating oil applied to the portion between the roller hold shaft 11d and the roller 13 exudes, the lubricating oil attaches to the roller receiving portion 15d, but the lubricating oil does not exude to the shutter base plate 1.

As illustrated in FIG. 4D, the cylindrical portion 11f of the drive lever 11 engages with the shaft 1b of the shutter base plate 1, so that the drive lever 11 is rotatably supported by the shaft 1b of the shutter base plate 1. Then, the blade lever 15 is engaged with the cylindrical portion 11f of the drive lever 11, so that the blade lever 15 is rotatably supported by the cylindrical portion 11f of the drive lever 11. Therefore, the blade lever 15 rotates with respect to the shutter base plate 1, and the drive lever 11 rotates with respect to the shutter base plate 1 around the same axis as that of the blade lever 15.

As illustrated in FIG. 4D, the blade drive spring 14, i.e., a torsion spring, is provided between the ratchet 16 and the drive lever 11. One end 14a of the blade drive spring 14 is fixed to the drive lever 11, and the other end 14b of the blade drive spring 14 is fixed to the ratchet 16. The blade drive spring 14 urges the drive lever 11 in the counterclockwise direction in FIG. 4A. The free length of the blade drive spring 14 is set longer than the interval between the drive lever 11 and the ratchet 16, and the blade drive spring 14 serves as the compression spring, thereby urging the drive lever 11 to the shutter base plate 1.

As illustrated in FIG. 4D, the inclined portion 15f is formed on the blade lever 15. Since the inclined portion 15f is formed, the roller receiving portion 15d of the blade lever 15 extends from the center of rotation of the blade lever 15 in a substantially cone shape. If the roller receiving portion 15d extends from the center of rotation of the blade lever 15 in a substantially cylindrical shape, inertial force acting on the blade lever 15 increases when the blade lever 15 rotates. In the present exemplary embodiment, the roller receiving portion 15d is formed in the substantially cone shape, so that the roller receiving portion 15d can be formed while suppressing an increase in the inertial force of the blade lever 15.

A procedure for fixing the drive lever 11 to the blade lever 15 will be described. First, the roller 13 is inserted into the roller hold shaft 11d. Thereafter, the blade lever 15 is inserted into the cylindrical portion 11f in the state as illustrated in FIG. 4A. Then, when the blade lever 15 is rotated in the counterclockwise direction with respect to the drive lever 11, the state as illustrated in FIG. 4C is attained. In the state as illustrated in FIG. 4C, the roller hold shaft 11d is located between the roller receiving portion 15d and the light-shielding wall portion 15c, and therefore, the drive lever 11 does not come off from the blade lever 15. The range in which the roller hold shaft 11d moves in the axial direction between the roller receiving portion 15d and the light-shielding wall portion 15c is smaller than the thickness of the roller 13. Therefore, the roller 13 does not come off from the roller hold shaft 11d.

In this manner, the drive lever 11, the roller 13, and the blade lever 15 are integrated, and the cylindrical portion 11f of the drive lever 11 is engaged with the shaft 1b of the shutter base plate 1.

Figure 5A:
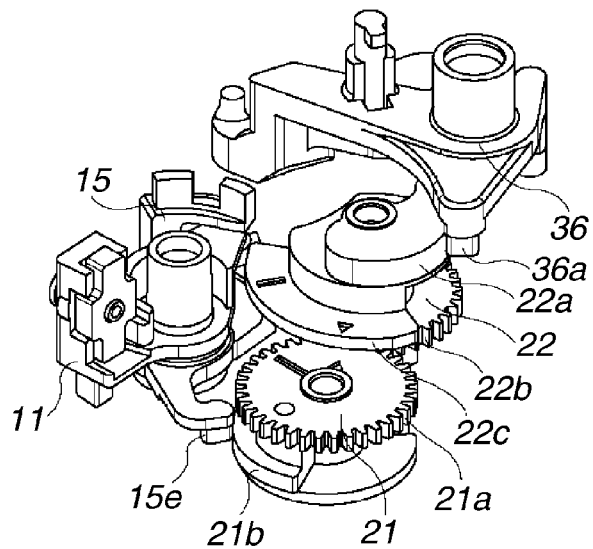
FIGS. 5A to 5C are diagrams illustrating the first cam gear and the second cam gear.
Figure 5B:
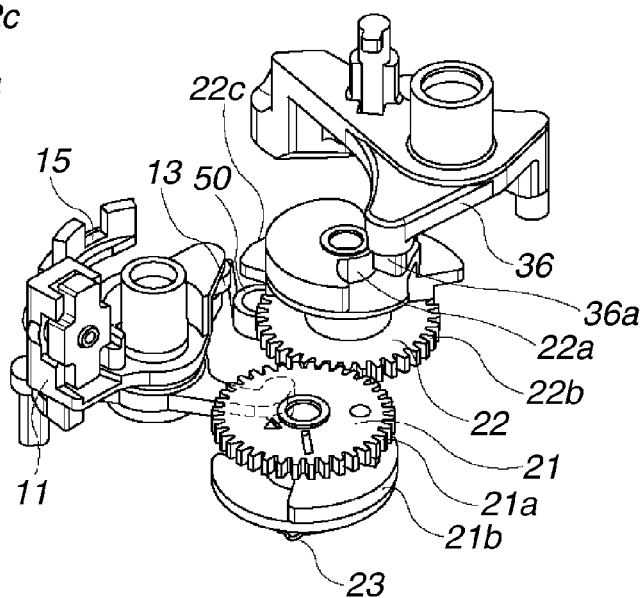
Figure 5C:
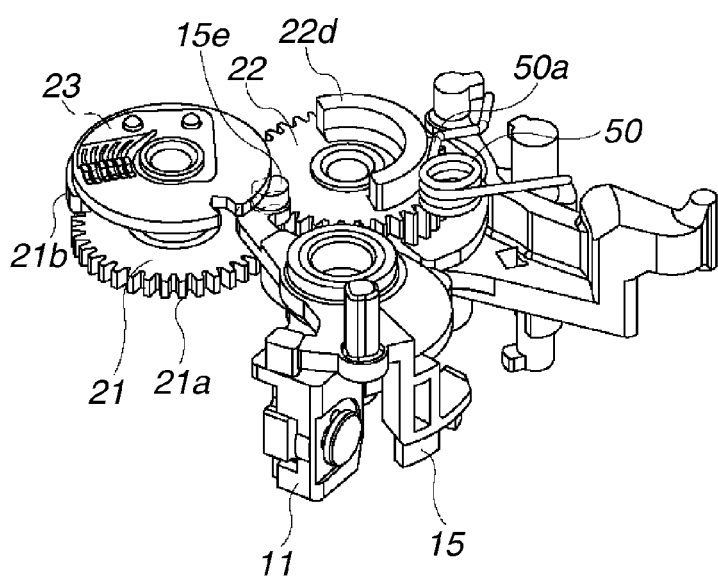

FIGS. 5A to 5C are diagrams illustrating the first cam gear 21 and the second cam gear 22. The gear 21a of the first cam gear 21 is in mesh with the gear 22b of the second cam gear 22, whereby rotation is transmitted. The gear 21a functions as a first gear unit, and the gear 22b functions as a second gear unit. The cam 21b is a hold cam portion traced by the cam follower 15e of the blade lever 15.

In the state as illustrated in FIG. 5A, the cam follower 15e is in contact with the cam 21b. In this state, counterclockwise force is exerted on the blade lever 15 by the blade return spring 46, but since the cam 21b and the cam follower 15e are in contact with each other, the blade lever 15 does not rotate. Therefore, the first cam gear 21 holds the blade lever 15 such that the first blade 41 and the second blade 42 close the apertures 1a and 2a. In other words, the cam 21b functions as a hold cam portion.

The state as illustrated in FIG. 5B is attained when the first cam gear 21 rotates in the counterclockwise direction from the state as illustrated in FIG. 5A. FIG. 5C is a diagram illustrating the state as illustrated in FIG. 5B as viewed from the shutter base plate. In the state as illustrated in FIG. 5B, the contact between the cam 21b and the cam follower 15e is released, and the blade lever 15 rotates in the counterclockwise direction by the blade return spring 46.

When the first cam gear 21 rotates in the counterclockwise direction from the state as illustrated in FIGS. 5B and 5C, the cam 21b comes into contact with the cam follower 15e, which causes the blade lever 15 to rotate in the clockwise direction. As a result, the blade return spring 46 is charged (has a load force applied to it).

The phase contact piece 23 is arranged on the bottom surface of the cam portion 21b. The phase contact piece 23 comes into contact with the pattern portion 38c of the flexible wiring board (FPC) 38, and detects the phase of rotation of the first cam gear 21.

The gear 22b of the second cam gear 22 is in mesh with the reduction gear train 48, and transmits the drive force of the motor 47.

The number of teeth of the gear 22b and the number of teeth of the gear 21a are set at the same number. The gear 22b and the gear 21a are in mesh with each other with a predetermined phase. Accordingly, when the first cam gear 21 rotates one turn, the second cam gear 22 also rotates one turn, and the first cam gear 21 and the second cam gear 22 rotate with the predetermined phase and at the same number of rotations.

The first cam 22a serving as the first cam portion is in contact with the cam follower 36a of the mirror lever 36, and causes the mirror lever 36 to rotate to the upper position and the lower position. More specifically, when the second cam gear 22 is at a first position where the first cam 22a and the cam follower 36a of the mirror lever 36 are in contact with each other, the second cam gear 22 causes the main mirror 6 to move downward to cause the main mirror 6 to enter into the photographic optical path. When the second cam gear 22 is at a second position where the first cam 22a and the cam follower 36a of the mirror lever 36 are no longer in contact with each other, the second cam gear 22 causes the main mirror 6 to move upward to retract the main mirror 6 out of the photographic optical path.

The second cam 22c serving as the second cam portion comes into contact with the roller 13 held on the drive lever 11, and performs charge and release operation of the drive lever 11.

The third cam 22d comes into contact with a movable arm portion 50a of the cam gear control spring 50 provided on the shutter base plate 1. With the rotation of the second cam gear 22, the cam gear control spring 50 attains either a charged state or a charge-released state. This controls the rotation of the second cam gear 22. As illustrated in FIGS. 5B and 5C, when the cam gear control spring 50 is charged, the rotation of the second cam gear 22 is suppressed by causing the cam gear control spring 50 to give a side pressure to the third cam 22d. More specifically, the cam gear control spring 50 brakes the second cam gear 22 from when the cam gear control spring 50 starts charging operation to when the cam gear control spring 50 finishes charging operation. On the other hand, the cam gear control spring 50 pushes the second cam gear 22 to support rotation from when the cam gear control spring 50 starts charging release operation to when the cam gear control spring 50 finishes charging release operation.

The third cam 22d is located closer to the shutter base plate than the second cam 22c. As a result, the third cam 22d coming into contact with the cam gear control spring 50 can be easily formed. Moreover, the third cam 22d does not result in increasing the size of the drive unit of the shutter.

Figure 6:
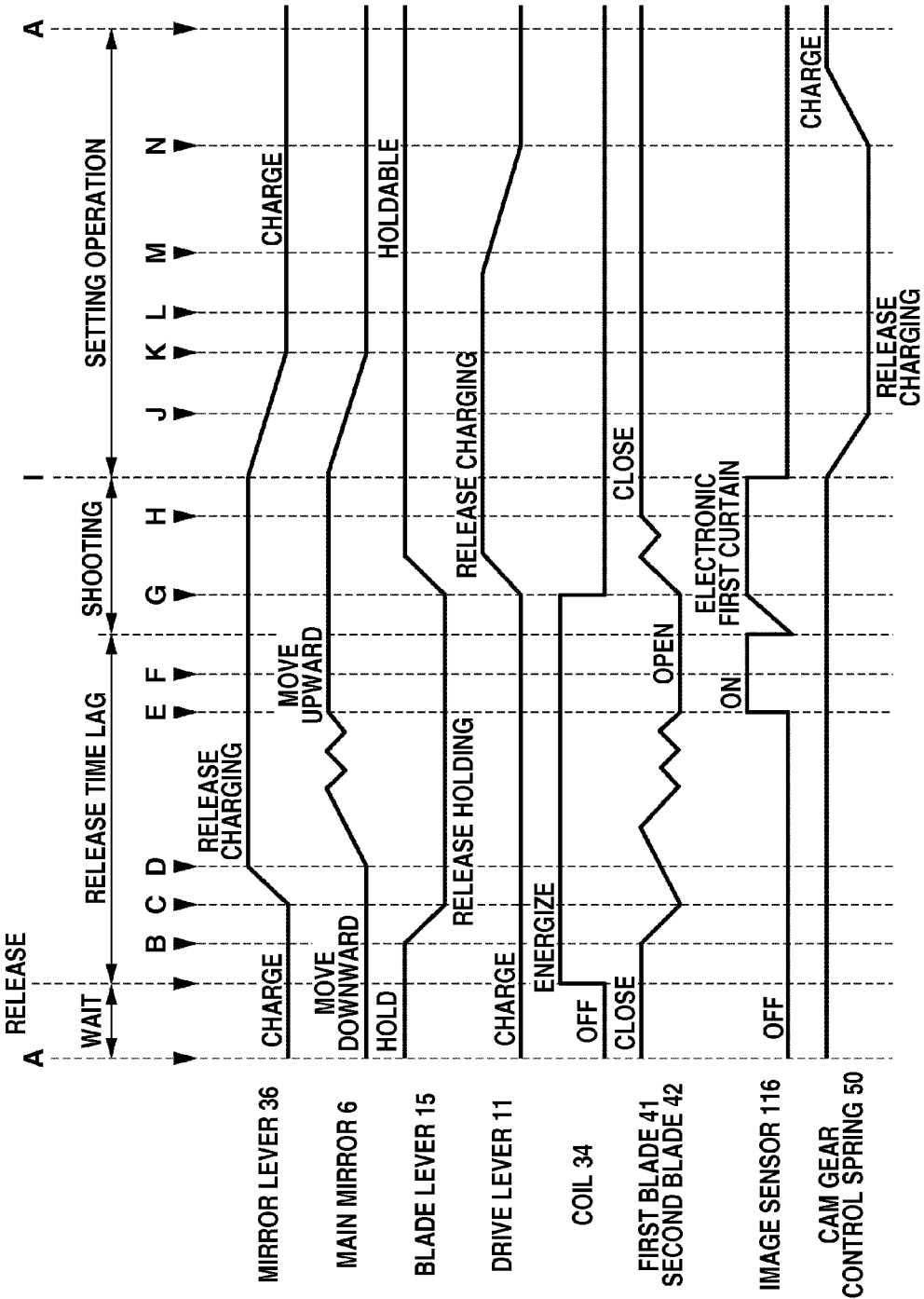
FIG. 6 is a timing chart illustrating operation timing of a mirror lever, a main mirror, the blade lever, the drive lever, a coil, a blade group, an image sensor, and a cam gear control spring.

FIG. 6 is a timing chart illustrating operation timing of the mirror lever 36, the main mirror 6, the blade lever 15, the drive lever 11, the coil 34, the blade group, the image sensor 116, and the cam gear control spring 50. The operation of the shutter unit 100 will be described with reference to FIGS. 7A to 7C to FIGS. 17A and 17B when the shutter unit 100 changes from a state A as illustrated in FIG. 6 to a state N.

Figure 7A:
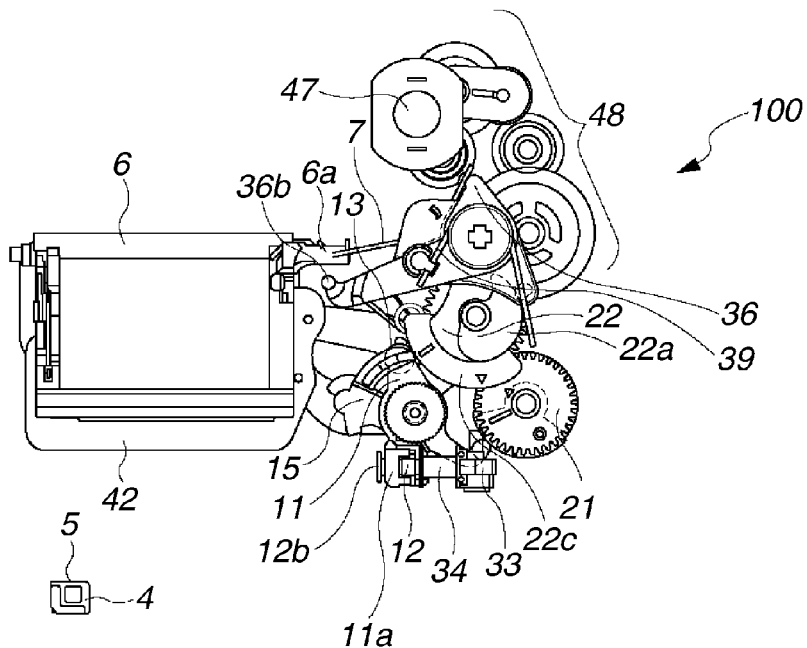
FIGS. 7A to 7C are diagrams illustrating a state of the shutter unit in a pre-release waiting state.
Figure 7B:
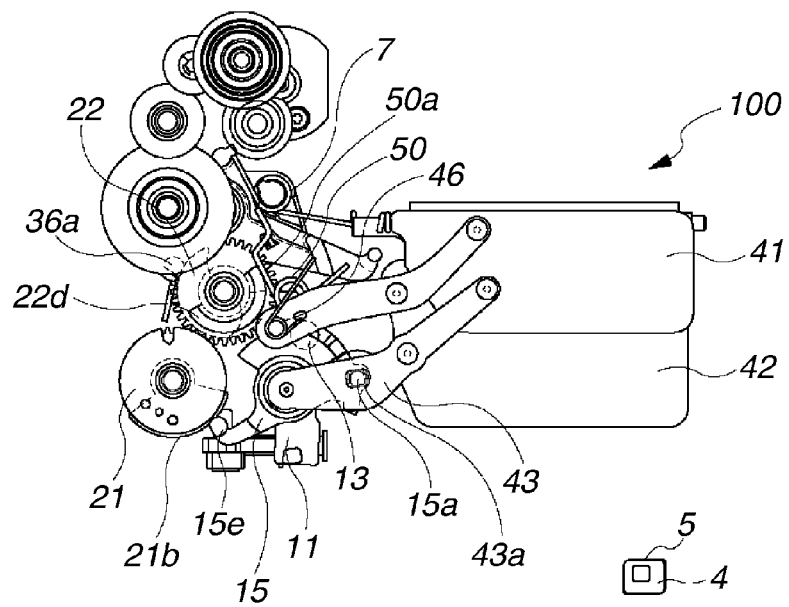
Figure 7C:
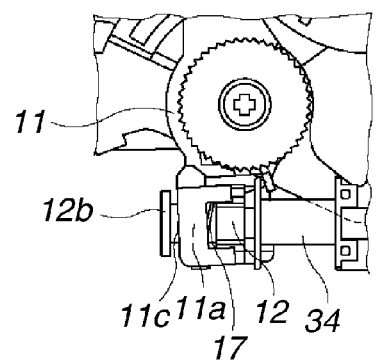

The state A as illustrated in FIG. 6 is a pre-release waiting state. FIGS. 7A to 7C illustrate the state of the shutter unit 100 in the pre-release waiting state. FIG. 7A is a diagram illustrating the shutter unit 100 as viewed from the main mirror 6. FIG. 7B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

In the pre-release waiting state, the first cam gear 21 and the second cam gear 22 stop at positions as illustrated in FIGS. 7A and 7B.

The roller 13 held on the drive lever 11 is in contact with a cam top portion 22d of the second cam 22c of the second cam gear 22. The drive lever 11 is in a state where the blade drive spring 14 is overcharged. The state where the blade drive spring 14 is overcharged means a state in which the coil 34 is energized, whereby the yoke 33 moves beyond the position where the armature 12 can be held, and the drive lever 11 is moved in a direction in which the blade drive spring 14 is charged. As illustrated in FIG. 7C, in the over-charged state, the armature 12 is in contact with the yoke 33, but the armature holding portion 11a of the drive lever 11 compresses the armature spring 17, and the flange unit 12b of the armature 12 and the protrusion unit 11c of the blade drive member move away from each other.

The cam follower 15e of the blade lever 15 is in contact with the cam top 21c of the cam 21b of the first cam gear 21. As a result, the blade lever 15 is maintained in a state as illustrated in the figure.

In FIG. 7B, the blade return spring 46 urges the sub-arm 44 in the clockwise direction, but the blade lever 15 is held. Accordingly, against the urging force of the blade return spring 46, the first blade 41 and the second blade 42 are held in a state in which the apertures 1a and 2a are closed.

At this occasion, the roller receiving portion 15d of the blade lever 15 is at the position facing the roller 13, so that this prevents the roller 13 from coming off from the roller hold shaft 11d.

The cam follower 36a of the mirror lever 36 comes into contact with a cam top portion 22e of the first cam 22a of the second cam gear 22, whereby the mirror lever 36 maintains the mirror lever drive spring 39 in the charged state as illustrated in FIG. 7A.

The main mirror 6 is urged by the main mirror drive spring 7 in a downward direction. The main mirror 6 comes into contact with a stopper, not illustrated, and the main mirror 6 is at the lower position. At this occasion, there is a clearance between the shaft portion 6a of the main mirror 6 and the contact portion 36b of the mirror lever 36. Therefore, even if error occurs in the position of the mirror lever 36, the position of the main mirror 6 is positioned at the correct position by the stopper, not illustrated.

At this occasion, the arm portion 50a of the cam gear control spring 50 is in contact with the third cam 22d of the second cam gear 22, and the charging operation of the cam gear control spring 50 is completed.

When a release signal is input in the pre-release waiting state, the coil 34 is energized, and the yoke 33 attracts the armature 12. At the same time, the motor 47 is energized, and the first cam gear 21 and the second cam gear 22 rotate, so that a blade lever hold release state B as illustrated in FIG. 6 is attained.

Figure 8A:
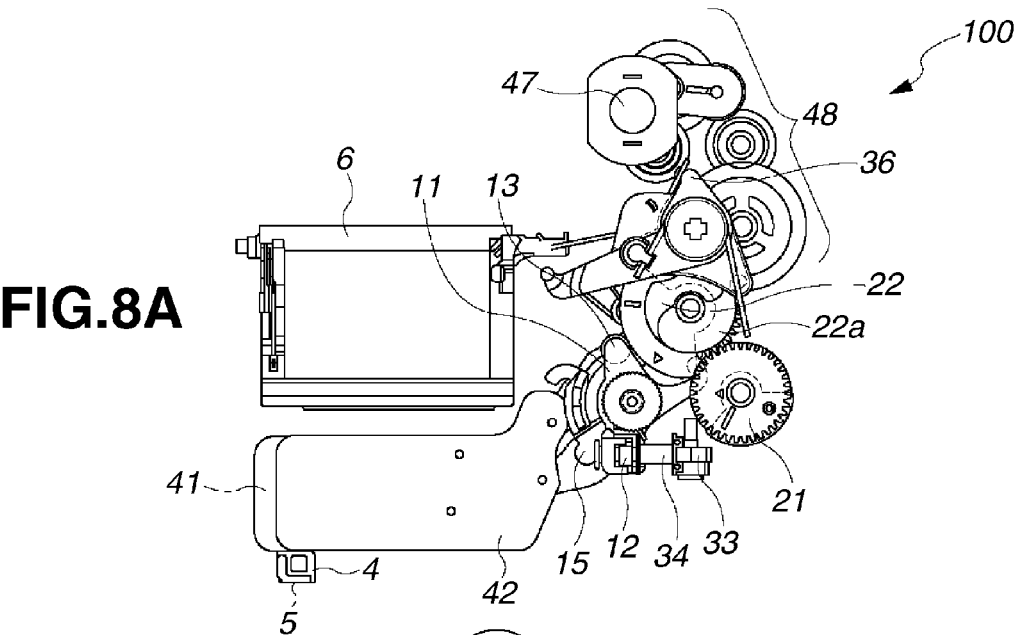
FIGS. 8A to 8C are diagrams illustrating a state of the shutter unit in a blade lever hold release state.
Figure 8B:
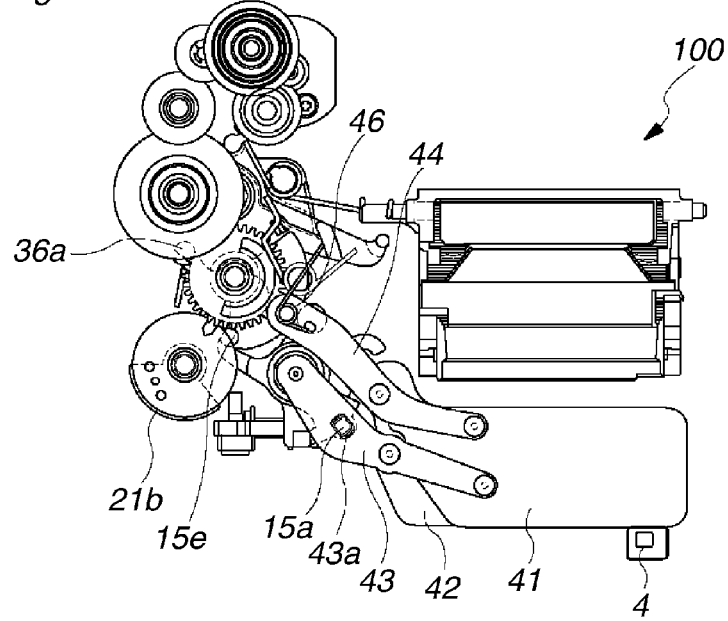
Figure 8C:
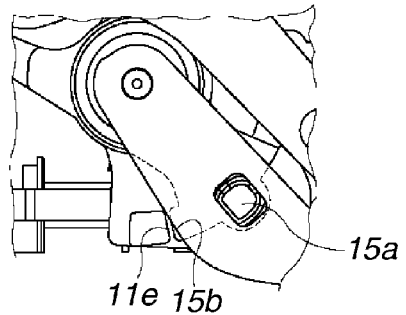

The state B as illustrated in FIG. 6 is the blade lever hold release state. FIGS. 8A to 8C illustrate a state of the shutter unit 100 in the blade lever hold release state. FIG. 8A is a diagram illustrating the shutter unit 100 as viewed from the main mirror 6. FIG. 8B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

In the blade lever hold release state, the first cam gear 21 and the second cam gear 22 stop at positions as illustrated in FIGS. 8A and 8B.

In this explanation, only the difference from the pre-release waiting state as illustrated in FIGS. 7A to 7C will be described, and description about the elements that have not changed from the pre-release waiting state is omitted.

When the motor 47 is energized, the first cam gear 21 rotates from the state as illustrated in FIGS. 7A to 7C to the state as illustrated in FIGS. 8A to 8C. When the first cam gear 21 attains the state as illustrated in FIGS. 8A to 8C, the cam follower 15e of the blade lever 15 is no longer in contact with the cam top 21c of the cam 21b of the first cam gear 21. More specifically, the cam 21b moves out of the track along which the cam follower 15e of the blade lever 15 rotates, and the held blade lever 15 is released, so that the blade lever 15 becomes rotatable with respect to the shaft 1b.

When holding of the held blade lever 15 is released, the first blade 41 and the second blade 42 run in a direction to open the apertures 1a and 2a with the urging force of the blade return spring 46, which urges the sub-arm 44. Accordingly, the blade lever 15 rotates with respect to the shaft 1b.

At this occasion, the roller 13 attached to the roller hold shaft 11d of the drive lever 11 moves along the roller receiving portion 15d of the blade lever 15 not to detach from the roller hold shaft 11d.

In the blade lever hold release state, as illustrated in FIGS. 8A and 8B, the first blade 41 and the second blade 42 run in the direction to open the apertures 1a and 2a, and thereafter the first blade 41 and the second blade 42 collide with the blade cushioning member 4 while the first blade 41 and the second blade 42 overlap each other. The blade cushioning member 4 alleviates the shock applied to the first blade 41 and the second blade 42 when the first blade 41 and the second blade 42 have been moved.

The periphery of the blade cushioning member 4 is covered with the blade contact member 5. More specifically, when the first blade 41 and the second blade 42 collide with the blade cushioning member 4 while the first blade 41 and the second blade 42 overlap each other, the blade contact member 5 is located between the blade cushioning member 4 and the blade group including the first blade 41 and the second blade 42. The blade contact member 5 is made of a material having higher degree of resistance to abrasion than the blade cushioning member 4.

When the first blade 41 and the second blade 42 collide with the blade cushioning member 4, the first blade 41 and the second blade 42 directly come into contact with the blade contact member 5 without directly coming into contact with the blade cushioning member 4. Since the blade contact member 5 is made of a material having high degree of resistance to abrasion such as metal, it is less likely to generate abrasion powder even if the first blade 41 and the second blade 42 directly come into contact with the blade contact member 5. Since the first blade 41 and the second blade 42 do not come into direct contact with the blade cushioning member 4, the blade cushioning member 4 may be made of a material having high cushioning performance even if the material is likely to generate abrasion powder.

As illustrated in FIGS. 8A and 8B, when the first blade 41 and the second blade 42 come into contact with the blade contact member 5, there is a clearance between the protruding portion 11e of the drive lever 11 and the protruding portion 15b of the blade lever 15 as illustrated in FIG. 8C. In this state, as illustrated in FIG. 7C, the drive lever 11 over-charges the blade drive spring 14.

In this state, even when the first blade 41 and the second blade 42 are caused to run in the opening direction according to the urging force applied by the blade return spring 46, the blade lever 15 does not come into contact with the drive lever 11. Therefore, the drive lever 11 does not receive the shock that is caused when the first blade 41 and the second blade 42 are caused to run in the opening direction according to the urging force applied by the blade return spring 46. When the blade drive spring 14 is over-charged, the drive lever 11 presses the armature 12 onto the yoke 33. When a shock is applied to the drive lever 11 at this occasion, the attracting surfaces of the armature 12 and the yoke 33 are damaged. The damaged attracting surfaces of the armature 12 and the yoke 33 result in a decrease in the accuracy of exposure, but in the present exemplary embodiment, the attracting surfaces of the armature 12 and the yoke 33 are not damaged.

When the first blade 41 and the second blade 42 are caused to run in the opening direction according to the urging force applied by the blade return spring 46, and the first blade 41 and the second blade 42 come into contact with the blade contact member 5, the first blade 41 and the second blade 42 bound as illustrated in FIG. 6.

When the shutter unit 100 changes from the pre-release waiting state to the blade lever hold release state, the second cam gear 22 also rotates as the first cam gear 21 rotates. The second cam gear 22 is as illustrated in FIG. 8A. That is, the cam follower 36a of the mirror lever 36 is in contact with the cam top portion 22e of the first cam 22a of the second cam gear 22. Therefore, like the state as illustrated in FIG. 7A, the mirror lever 36 is held to charge the mirror lever drive spring 39.

Like the state as illustrated in FIG. 7A, the main mirror 6 is also urged in a downward direction by the main mirror drive spring 7, and the main mirror 6 comes into contact with the stopper, not illustrated, and the main mirror 6 is at the lower position. That is, the first blade 41 and the second blade 42 open the apertures 1a and 2a, but the main mirror 6 is still at the lower position.

When the motor 47 is continuously energized, the motor 47 rotates the first cam gear 21 and the second cam gear 22, so that a mirror lever hold release state C as illustrated in FIG. 6 is attained.

The state C as illustrated in FIG. 6 is the mirror lever hold release state. The first cam gear 21 and the second cam gear 22 further rotate from the state as illustrated in FIG. 6. As the second cam gear 22 rotates, the cam follower 36a of the mirror lever 36 is no longer in contact with the first cam 22a of the second cam gear 22. When the first cam 22a moves out of the track along which the cam follower 36a rotates, the charged mirror lever drive spring 39 is released, and the mirror lever 36 rotates in the clockwise direction in FIG. 8A by the urging force applied by the mirror lever drive spring 39.

In the pre-release waiting state, there is a clearance between the shaft portion 6a of the main mirror 6 and the contact portion 36b of the mirror lever 36. Therefore, the mirror lever 36 rotates in the clockwise direction in FIG. 8A for the distance equivalent to this clearance, and thereafter, the contact portion 36b of the mirror lever 36 comes into contact with the shaft portion 6a of the main mirror 6. When the contact portion 36b of the mirror lever 36 comes into contact with the shaft portion 6a of the main mirror 6, the state D as illustrated in FIG. 6 changes to a mirror lever contact state.

The state as illustrated in FIG. 6 is the mirror lever contact state. In this state, the contact portion 36b of the mirror lever 36 comes into contact with the shaft portion 6a of the main mirror 6, and the mirror lever 36 starts rotating the main mirror 6 in the upward direction against the urging force applied by the main mirror drive spring 7.

When the main mirror 6 comes into contact with the stopper, not illustrated, the main mirror 6 bounds as illustrated in FIG. 6, and thereafter the main mirror 6 stops at the upper position. The mirror lever drive spring 39 has a relatively strong spring force to reduce the time the main mirror 6 bounds (bounding time). Therefore, this bounding time is less than a bounding time the first blade 41 and the second blade 42 bound in the blade lever hold release state. When the bounding of the main mirror 6 converges, a mirror up live view state E as illustrated in FIG. 6 is attained.

Figure 9A:
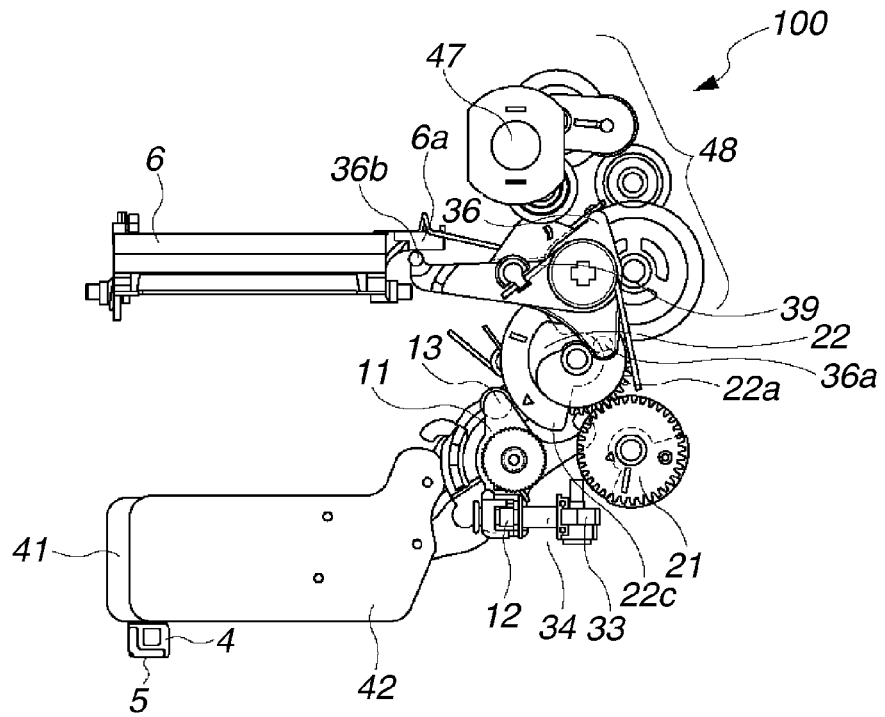
FIGS. 9A and 9B are diagrams illustrating a state of the shutter unit in a mirror up live view state.
Figure 9B:
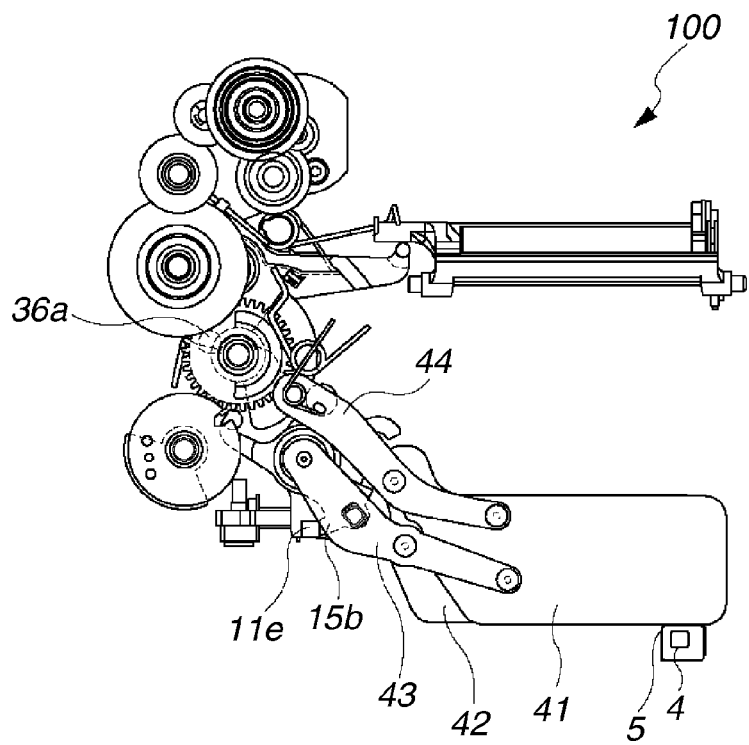

The state E as illustrated in FIG. 6 is the mirror up live view state. FIGS. 9A and 9B illustrate a state of the shutter unit 100 in the mirror up live view state. FIG. 9A is a diagram illustrating the shutter unit 100 as viewed from the main mirror 6.

FIG. 9B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

In the mirror up live view state, the first cam gear 21 and the second cam gear 22 stop at positions as illustrated in FIGS. 9A and 9B.

The drive lever 11 and the blade lever 15 are in the same state as those illustrated in FIGS. 8A and 8B. That is, the first blade 41 and the second blade 42 open the apertures 1a and 2a, so that the first blade 41 and the second blade 42 are in contact with the blade contact member 5. In the mirror up live view state, the roller 13 held on the drive lever 11 is also in contact with the cam top portion 22d of the second cam 22c of the second cam gear 22, and therefore, the blade drive spring 14 is over-charged. Therefore, in the mirror up live view state, there is also a clearance between the protruding portion 11e of the drive lever 11 and the protruding portion 15b of the blade lever 15 as illustrated in FIG. 8C.

As described above, the cam follower 36a of the mirror lever 36 is no longer in contact with the first cam 22a of the second cam gear 22, and the mirror lever 36 rotates according to the urging force applied by the mirror lever drive spring 39. Then, the mirror lever 36 rotates the main mirror 6 in the upward direction against the urging force applied by the main mirror drive spring 7.

When the motor 47 is stopped in this state, a light flux having passed through the interchangeable lens 201 reaches the image sensor 116, and an object image taken by the image sensor 116 is displayed on a display monitor, i.e., the imaging apparatus attains a so-called live view state.

In the mirror up live view state, the roller 13 held on the drive lever 11 is in contact with the cam top portion 22d of the second cam 22c of the second cam gear 22. Accordingly, even if the coil 34 is de-energized, the first blade 41 and the second blade 42 maintain the apertures 1a and 2a open.

In the mirror up live view state, the motor 47 is energized, which causes the first cam gear 21 and the second cam gear 22 to rotate, and the motor 47 is stopped in a set release state F as illustrated in FIG. 6.

The state F as illustrated in FIG. 6 is the set release state. FIGS. 10A to 10D illustrate a state of the shutter unit 100 in the set release state. FIG. 10A is a diagram illustrating the shutter unit 100 as viewed from the main mirror 6. FIG. 10B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

In the set release state, the first cam gear 21 and the second cam gear 22 stop at positions as illustrated in FIGS. 10A and 10B.

In the set release state, the second cam gear 22 rotates, so that the roller 13 held on the drive lever 11 is no longer in contact with the cam top portion 22d of the second cam 22c of the second cam gear 22. As a result, the drive lever 11 rotates in the clockwise direction in FIG. 10A by the urging force applied by the blade drive spring 14, and the over-charged state of the blade drive spring 14 is released. Even when the roller 13 is no longer in contact with the cam top portion 22d of the second cam 22c, the coil 34 is still energized, the armature 12 is attracted by the yoke 33, and the first blade 41 and the second blade 42 maintain the apertures 1a and 2a open.

When the over-charged state of the blade drive spring 14 is released, the flange unit 12b of the armature 12 comes into contact with the protrusion unit 11c of the blade drive member according to the urging force applied by the armature spring 17. As a result, as illustrated in FIG. 10C, the drive lever 11 slightly rotates, and the protruding portion 11e of the drive lever 11 comes into contact with the protruding portion 15b of the blade lever 15. Then, as illustrated in FIG. 10D, the protruding portion 11e of the drive lever 11 presses the protruding portion 15b of the blade lever 15, so that the first blade 41 and the second blade 42 are no longer in contact with the blade contact member 5.

In other words, the coil 34 is energized when the blade drive spring 14 is over-charged, so that the yoke 33 attracts the armature 12, and before the over-charged state of the blade drive spring 14 is released, the blade lever 15 comes into contact with the drive lever 11.

In the set release state, the main mirror 6 stops at the upper position, like the mirror up live view state.

As illustrated in FIG. 6, reset scanning of pixels of the image sensor 116 is performed (hereinafter referred to as electronic first curtain travel) in the set release state, whereby a photographic exposure operation starts. A time from when a release signal is input to when the electronic first curtain travel is performed is a release time lag. In the present exemplary embodiment, the opening operation of the first blade 41 and the second blade 42 of which bounding time is relatively long is started before the upward moving operation of the main mirror 6 of which bounding time is relatively short. If the opening operation of the first blade 41 and the second blade 42 and the upward moving operation of the main mirror 6 are started at the same time, the electronic first curtain travel cannot be performed unless the bounding of the first blade 41 and the second blade 42 converges even after the bounding of the main mirror 6 converges. Therefore, it takes a longer release time lag. In the present exemplary embodiment, in view of this issue, the upward moving operation of the main mirror 6 is started after the opening operation of the first blade 41 and the second blade 42 is started.

The upward moving operation of the main mirror 6 is started after the opening operation of the first blade 41 and the second blade 42 is started, and this reduces the chance of direct sunlight incident upon the first blade 41 and the second blade 42. Therefore, even when the first blade 41 and the second blade 42 are made of polyethylene terephthalate including blackening, the first blade 41 and the second blade 42 are less likely to be damaged by the direct sunlight incident thereon.

After a time interval corresponding to a set shutter time in seconds passes since the electronic first curtain travel starts, the coil 34 is de-energized, so that a blade running state G as illustrated in FIG. 6 is attained.

Figure 11A:
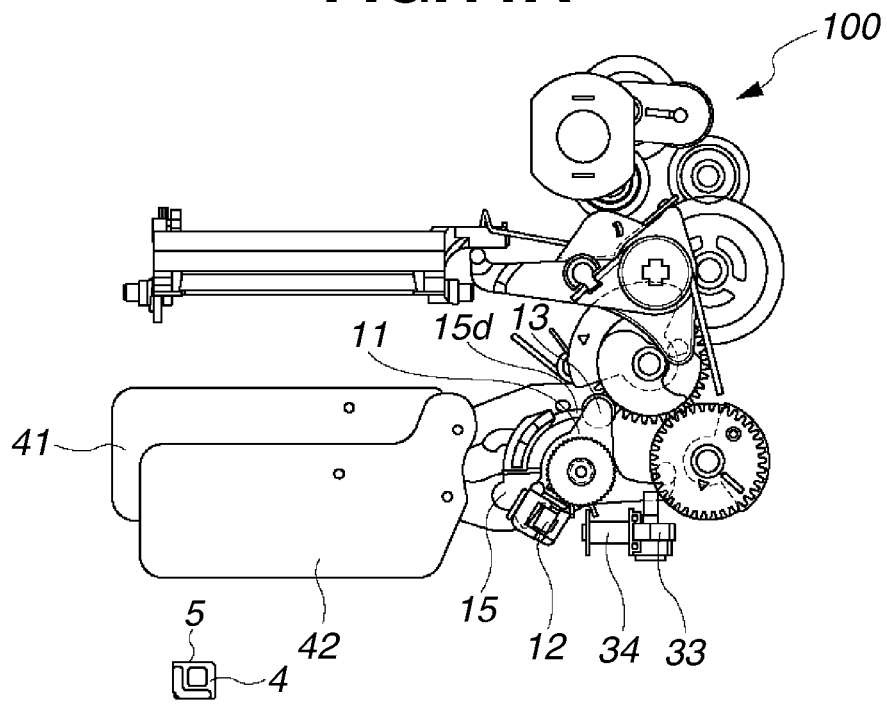
FIGS. 11A and 11B are diagrams illustrating a state of the shutter unit in a blade running state.
Figure 11B:
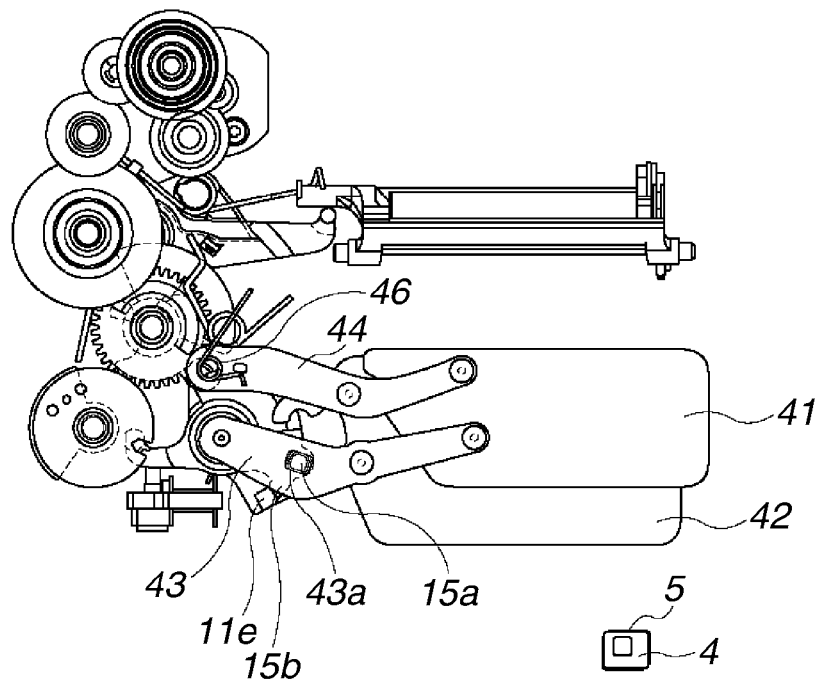

The state G as illustrated in FIG. 6 is the blade running state. FIGS. 11A and 11B illustrate a state of the shutter unit 100 in the blade running state. FIG. 11A is a diagram illustrating the shutter unit 100 as viewed from the main mirror. FIG. 11B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

As illustrated in FIGS. 11A and 11B, the coil 34 is de-energized, and as a result, the first blade 41 and the second blade 42 cannot maintain the apertures 1a and 2a open.

The drive lever 11 rotates as illustrated in FIGS. 11A and 11B according to the urging force applied by the blade drive spring 14. When the drive lever 11 rotates, the protruding portion 11e of the drive lever 11 pushes the protruding portion 15b of the blade lever 15, which causes the blade lever 15 to rotate. Since the drive lever 11 and the blade lever 15 rotate together, the first blade 41 and the second blade 42 run in a direction to close the apertures 1a and 2a against the urging force applied by the blade return spring 46

In the set release state as illustrated in FIG. 10, the protruding portion 11e of the drive lever 11 is already in contact with the protruding portion 15b of the blade lever 15. When the coil 34 is de-energized, the drive lever 11 and the blade lever 15 rotate together according to the urging force applied by the blade drive spring 14. In other words, in the present exemplary embodiment, when the first blade 41 and the second blade 42 run in the direction to close the apertures 1a and 2a, the drive lever 11 and the blade lever 15 rotate together in an integrated manner since the first blade 41 and the second blade 42 start to run.

There may be a case where the protruding portion 11e of the drive lever 11 collides with the protruding portion 15b of the blade lever 15 while the first blade 41 and the second blade 42 run in the direction to close the apertures 1a and 2a, and thereafter the drive lever 11 and the blade lever 15 rotate together in an integrated manner. In this case, however, the rotating speed changes before and after the collision of the drive lever 11 and the blade lever 15, and this reduces the precision in the running operation of the first blade 41 and the second blade 42.

In the present exemplary embodiment, before the first blade 41 and the second blade 42 run, the drive lever 11 and the blade lever 15 are integrated, and the drive lever 11 and the blade lever 15 rotate together in the integrated manner while the first blade 41 and the second blade 42 run. This stabilizes the rotating speed of the drive lever 11 and the blade lever 15, and improves the precision in the running operation of the first blade 41 and the second blade 42.

Further, since the drive lever 11 and the blade lever 15 rotate together, the relative position does not change between the roller 13 attached to the roller hold shaft 11d of the drive lever 11 and the roller receiving portion 15d of the blade lever 15. Therefore, while the first blade 41 and the second blade 42 run in the direction to close the apertures 1a and 2a, no abrasion occurs between the roller 13 and the roller receiving portion 15d. Even when the direction of gravity acting on the roller changes due to change of the posture while the first blade 41 and the second blade 42 run, the relative position does not change between the roller 13 and the roller receiving portion 15d, and therefore, the abrasion coefficient does not change. In the present exemplary embodiment, the abrasion is reduced when the first blade 41 and the second blade 42 run in the direction to close the apertures 1a and 2a, and this improves the precision in the running operation of the first blade 41 and the second blade 42.

When the first blade 41 and the second blade 42 run to a position at which the apertures 1a and 2a are closed, a blade running completion state H as illustrated in FIG. 6 is attained.

Figure 12A:
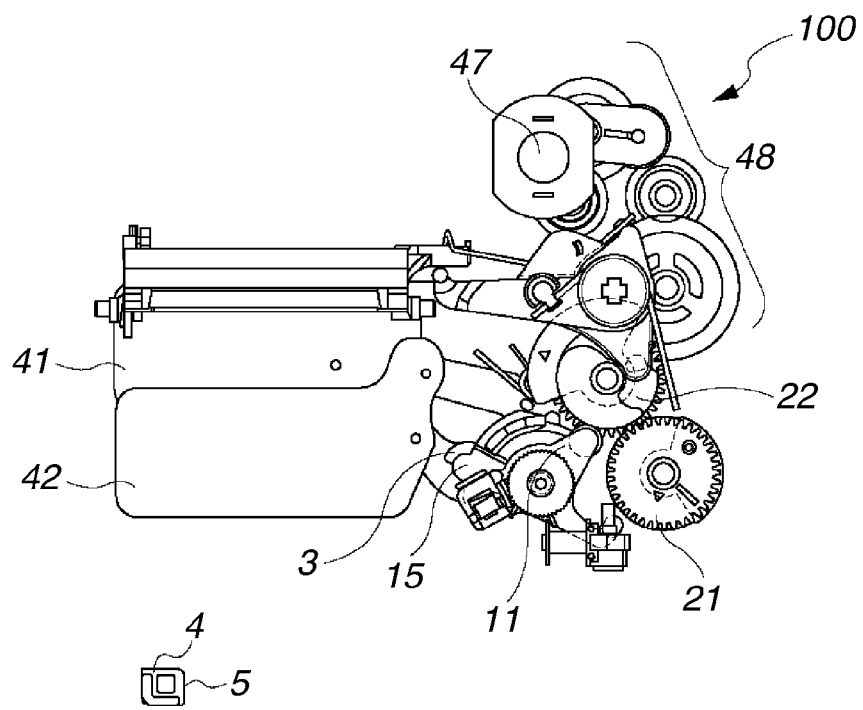
FIGS. 12A and 12B are diagrams illustrating a state of the shutter unit in a blade running completion state.
Figure 12B:
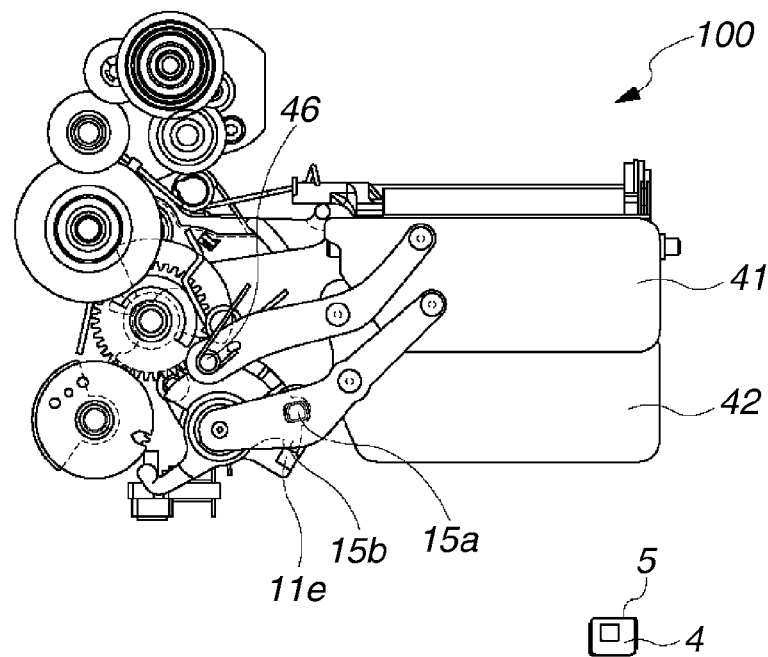

The state H as illustrated in FIG. 6 is the blade running completion state. FIGS. 12A and 12B illustrate a state of the shutter unit 100 in the blade running completion state. FIG. 12A is a diagram illustrating the shutter unit 100 as viewed from the main mirror 6. FIG. 12B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the engaging portion 15a formed on the blade lever 15 collides with the cushioning member 3 provided at the upper portion of the arc-shaped hole 1e formed in the shutter base plate 1, the first blade 41 and the second blade 42 stop at the position at which the apertures 1a and 2a are closed.

At this occasion, the protruding portion 11e of the drive lever 11 is in contact with the protruding portion 15b of the blade lever 15. In other words, in the present exemplary embodiment, when the first blade 41 and the second blade 42 run in the direction to close the apertures 1a and 2a, the drive lever 11 and the blade lever 15 rotate together throughout the run from the start to the end.

In the blade running completion state as illustrated in FIG. 12, the first blade 41 and the second blade 42 close the apertures 1a and 2a, so that the blade return spring 46 is charged.

In the blade running completion state, the photo-sensor 32 provided on the auxiliary base plate 31 is used to detect the blade lever 15 at a blade running completion rotational position.

After a predetermined period of time passes since the coil 34 is de-energized, the motor 47 is energized. When the motor 47 is energized, and the first cam gear 21 and the second cam gear 22 rotate, a mirror lever charge and cam gear control spring charge release start state I as illustrated in FIG. 6 is attained.

Figure 13A:
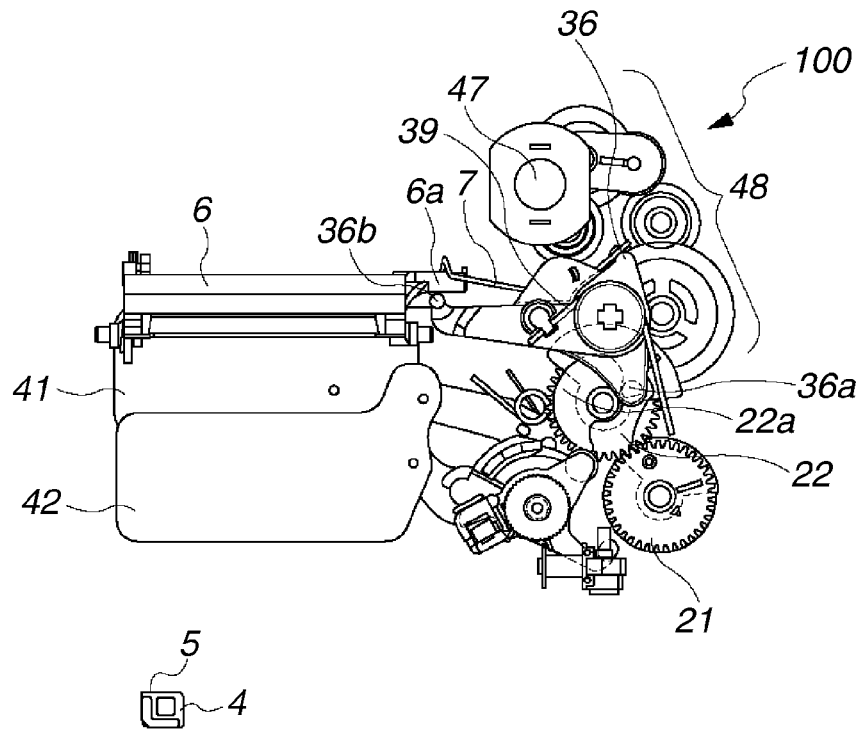
FIGS. 13A and 13B are diagrams illustrating a state of the shutter unit in a mirror lever charge and cam gear control spring charge release start state.
Figure 13B:
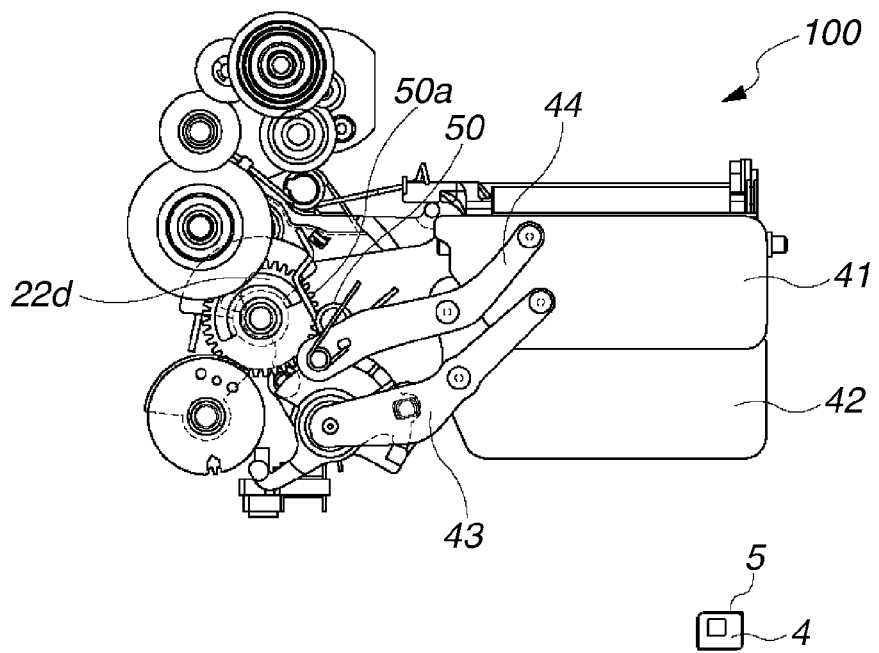

The state I as illustrated in FIG. 6 is the mirror lever charge and cam gear control spring charge release start state. FIGS. 13A and 13B illustrate a state of the shutter unit 100 in the mirror lever charge and cam gear control spring charge release start state. FIG. 13A is a diagram illustrating the shutter unit 100 as viewed from the main mirror 6. FIG. 13B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

The first cam gear 21 and the second cam gear 22 rotate from the state as illustrated in FIGS. 12A and 12B, the first cam 22a of the second cam gear 22 comes into contact with the cam follower 36a of the mirror lever 36. At the same time or slightly after this, the third cam 22d of the second cam gear 22 starts to release charging of the cam gear control spring 50.

When the second cam gear 22 rotates, the first cam 22a of the second cam gear 22 pushes the cam follower 36a of the mirror lever 36. Accordingly, the mirror lever 36 rotates in the counterclockwise direction in FIG. 13A, and the mirror lever 36 charges the mirror lever drive spring 39. When the mirror lever 36 rotates in the counterclockwise direction in FIG. 13A, the main mirror 6 rotates in the downward direction according to the urging force applied by the main mirror drive spring 7.

Further, the movable arm portion 50a of the cam gear control spring 50 pushes the third cam 22d of the second cam gear 22, which urges the second cam gear 22 in the counterclockwise direction in FIG. 13B. In other words, when charging of the cam gear control spring 50 is released, the cam gear control spring 50 applies urging force to the second cam gear 22. This urging force is in the direction opposite to the urging force applied by the mirror lever drive spring 39, and therefore, the urging force pushes and supports the rotation of the second cam gear 22 against the urging force applied by the mirror lever drive spring 39.

In the mirror lever charge and cam gear control spring charge release start state, the first blade 41 and the second blade 42 stop at a position at which the apertures 1a and 2a are closed, like the blade running completion state.

When the motor 47 is continuously energized in the mirror lever charge and cam gear control spring charge release start state, the first cam gear 21 and the second cam gear 22 further rotate, and a cam gear control spring charge release completion state J as illustrated in FIG. 6 is attained.

Figure 14A:
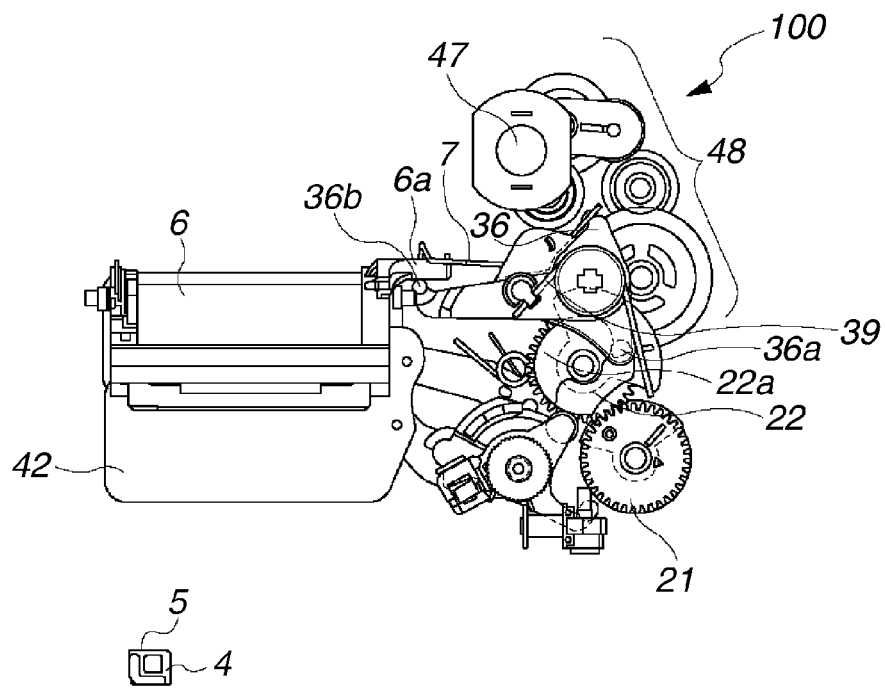
FIGS. 14A and 14B are diagrams illustrating a state of the shutter unit in a cam gear control spring charge release completion state.
Figure 14B:
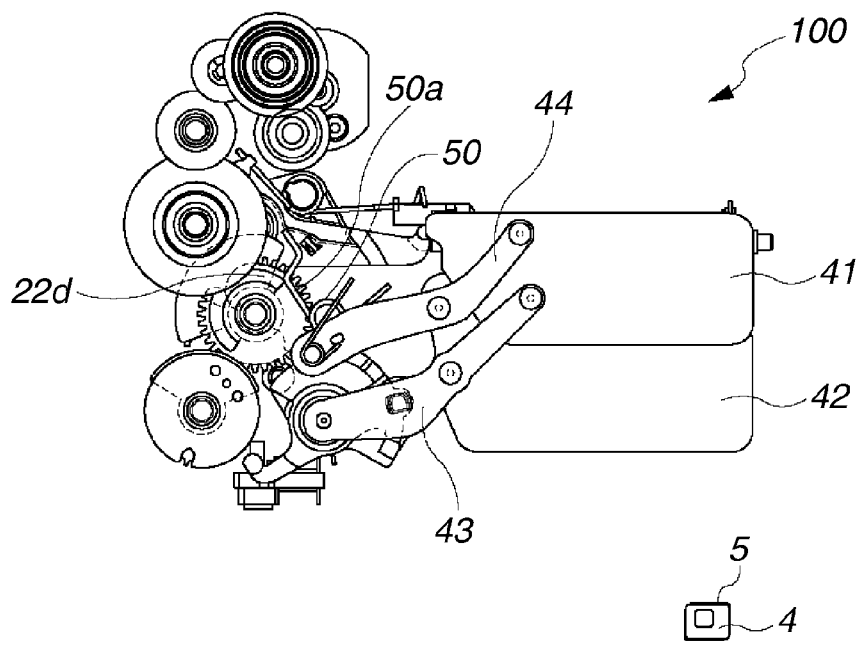

The state J as illustrated in FIG. 6 is the cam gear control spring charge release completion state. FIGS. 14A and 14B illustrate a state of the shutter unit 100 in the cam gear control spring charge release completion state. FIG. 14A is a diagram illustrating the shutter unit 100 as viewed from the main mirror 6. FIG. 14B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

The first cam gear 21 and the second cam gear 22 rotate from the state as illustrated in FIGS. 13A and 13B. As the second cam gear 22 rotates, the first cam 22a of the second cam gear 22 pushes the cam follower 36a of the mirror lever 36. As a result, the mirror lever 36 rotates in the counterclockwise direction in FIG. 14A, and the mirror lever drive spring 39 is charged. When the mirror lever 36 rotates in the counterclockwise direction in FIG. 14A, the main mirror 6 rotates in the downward direction according to the urging force applied by the main mirror drive spring 7.

When this state is attained, charging of the cam gear control spring 50 is completely released, and the cam gear control spring 50 no longer applies any urging force to the second cam gear 22. As a result, the cam gear control spring 50 no longer pushes and supports the rotation of the second cam gear 22.

Further, the motor 47 is energized, so that the first cam gear 21 and the second cam gear 22 rotate via the reduction gear train 48.

In the present exemplary embodiment, at the same time or slightly after the mirror lever drive spring 39 starts charging, charging of the cam gear control spring 50 starts to be released, and while the mirror lever drive spring 39 is charged, charging of the cam gear control spring 50 is configured to be completely released. However, the configuration is not limited thereto. From when the mirror lever drive spring 39 starts charging to when the mirror lever drive spring 39 finishes charging, charging of the cam gear control spring 50 may start to be released, and charging of the cam gear control spring 50 may be completely released. In this configuration, the drive force of the motor 47 required to charge the mirror lever drive spring 39 can be reduced.

The state K as illustrated in FIG. 6 is a mirror lever charge completion state. FIGS. 15A and 15B illustrate a state of the shutter unit 100 in the mirror lever charge completion state. FIG. 15A is a diagram illustrating the shutter unit 100 as viewed from the main mirror 6. FIG. 15B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the second cam gear 22 further rotates in the counterclockwise direction in FIG. 15A from the mirror lever charge state, the mirror lever 36 charges the mirror lever drive spring 39. As the mirror lever 36 rotates, the main mirror 6 further rotates in the downward direction, comes into contact with the stopper, not illustrated, and then stops. Even after the main mirror 6 stops at the lower position, the second cam gear 22 rotates, and the cam follower 36a of the mirror lever 36 reaches the cam top position 22e of the first cam 22a of the second cam gear 22. At this occasion, as illustrated in FIG. 15A, there is a clearance between the shaft portion 6a of the main mirror 6 and the contact portion 36b of the mirror lever 36. Therefore, even if error occurs in the position of the mirror lever 36, the position of the main mirror 6 is held at the correct position by the stopper, not illustrated.

When the motor 47 is continuously energized in the mirror lever charge completion state, the first cam gear 21 and the second cam gear 22 further rotate, so that a blade lever holdable state L as illustrated in FIG. 6 is attained.

Figure 16A:
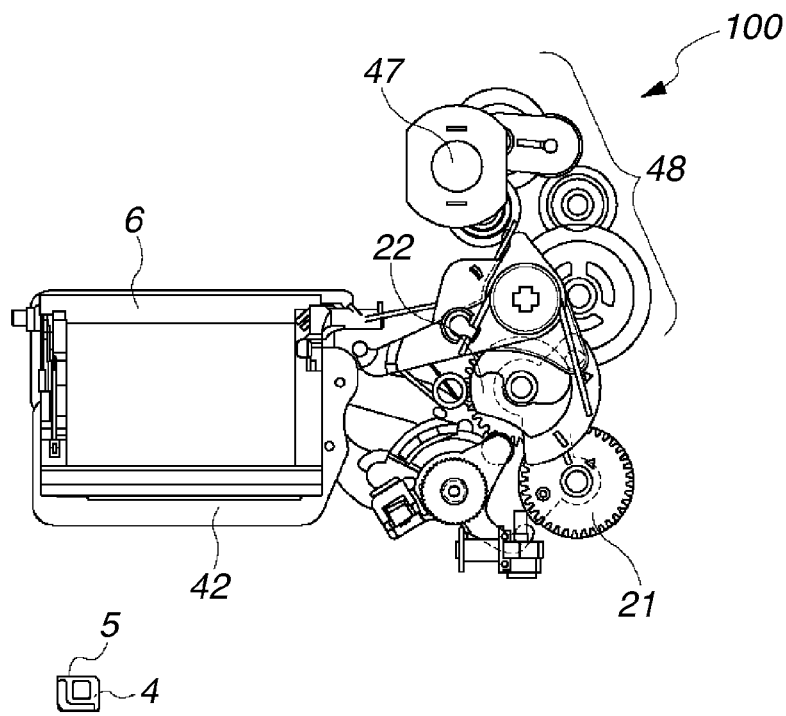
FIGS. 16A and 16B are diagrams illustrating a state of the shutter unit in a blade lever holdable state.
Figure 16B:
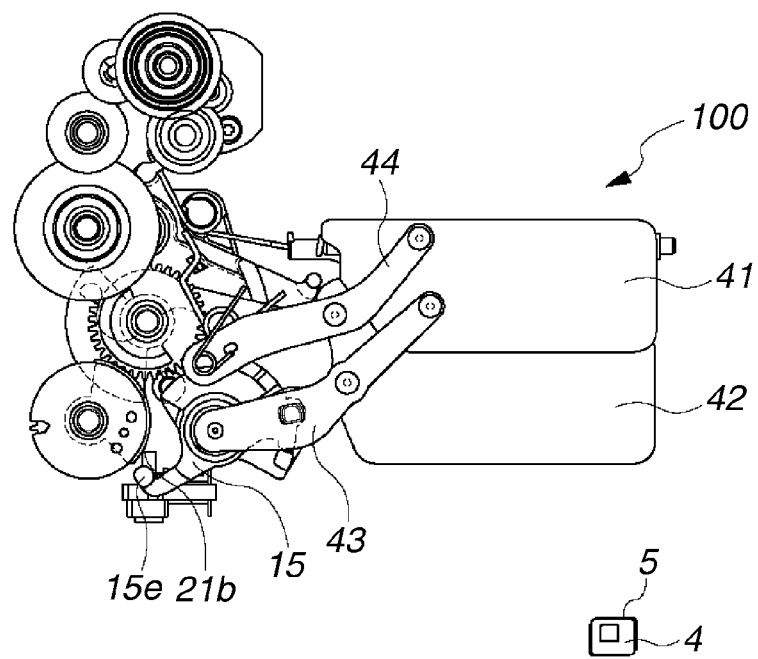

The state L as illustrated in FIG. 6 is the blade lever holdable state. FIGS. 16A and 16B illustrate a state of the shutter unit 100 in the blade lever holdable state. FIG. 16A is a diagram illustrating the shutter unit 100 as viewed from the main mirror 6. FIG. 16B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the first cam gear 21 rotates, the cam 21b of the first cam gear 21 moves to a position at which the cam follower 15e of the blade lever 15 can come into contact. In the blade lever holdable state as illustrated in FIGS. 16A and 16B, the urging force applied by the blade drive spring 14 causes the protruding portion 11e of the drive lever 11 to push the protruding portion 15b of the blade lever 15, and therefore, the cam follower 15e of the blade lever 15 is not in contact with the cam 21b of the first cam gear 21

When the motor 47 is continuously energized in the blade lever holdable state, the first cam gear 21 and the second cam gear 22 rotate, so that a drive lever charge state M as illustrated in FIG. 6 is attained.

Figure 17A:
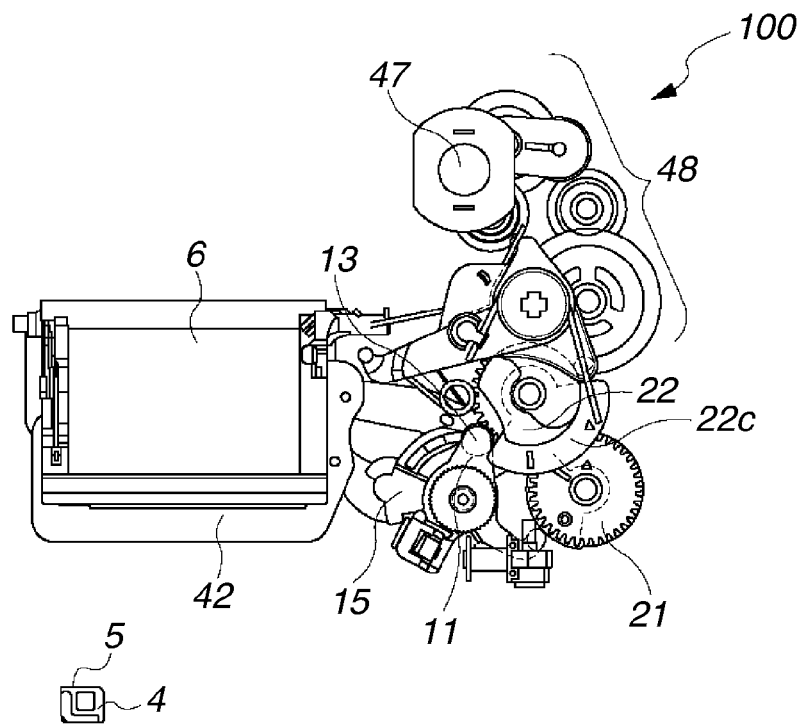
FIGS. 17A and 17B are diagrams illustrating a state of the shutter unit in a drive lever charge state.
Figure 17B:
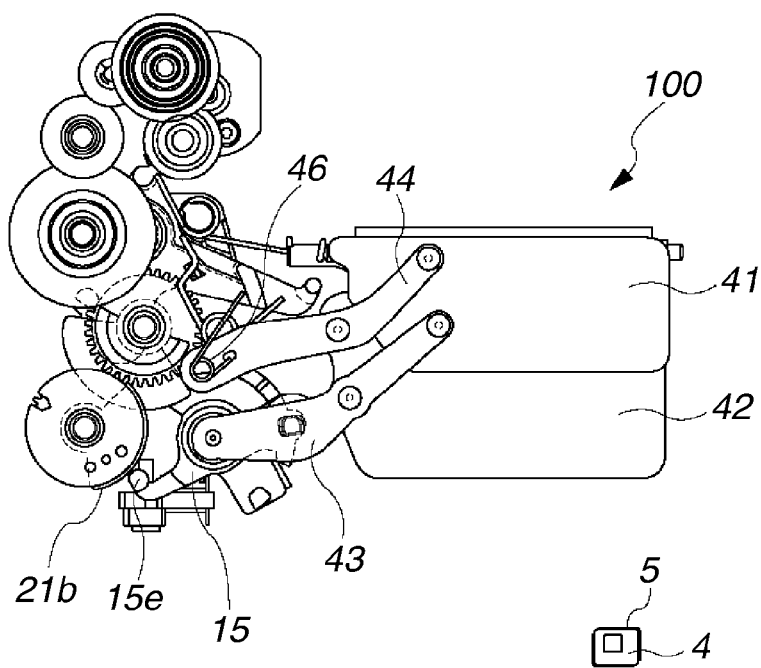

The state M as illustrated in FIG. 6 is the drive lever charge state. FIGS. 17A and 17B illustrate a state of the shutter unit 100 in the drive lever charge state. FIG. 17A is a diagram illustrating the shutter unit 100 as viewed from the main mirror 6. FIG. 17B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the second cam gear 22 rotates, the second cam 22c of the second cam gear 22 pushes the roller 13 held on the drive lever 11. As a result, the drive lever 11 rotates in the counterclockwise direction in FIG. 17A, and charges the drive spring 14. When the drive lever 11 rotates in the counterclockwise direction in FIG. 17A, the protruding portion 11e of the drive lever 11 and the protruding portion 15b of the blade lever 15 are no longer in contact with each other. Accordingly, the blade lever 15 rotates in the counterclockwise direction in FIG. 17B according to the urging force applied by the blade return spring 46, and the cam follower 15e of the blade lever 15 comes into contact with the cam 21b of the first cam gear 21. As a result, the blade lever 15 is held at the position as illustrated in FIG. 17B, and the first blade 41 and the second blade 42 maintain the apertures 1a and 2a closed.

When the motor 47 is continuously energized in the drive lever charge state, the second cam gear 22 further rotates, so that a drive lever charge completion state N as illustrated in FIG. 6 is attained.

The state N as illustrated in FIG. 6 is the drive lever charge completion state.

When the roller 13 held on the drive lever 11 reaches the cam top portion 22d of the second cam 22c of the second cam gear 22, the drive lever 11 over-charges the blade drive spring 14. In this state, the motor 47 is de-energized.

Even after the motor 47 is de-energized, the second cam gear 22 continues to rotate due to inertia until the second cam gear 22 completely stops.

Substantially at the same time as de-energizing the motor 47, the third cam 22d of the second cam gear 22 comes into contact with the movable arm portion 50a of the cam gear control spring 50, and starts charging the cam gear control spring 50. When the cam gear control spring 50 is charged, the rotation of the second cam gear 22 is suppressed by causing the cam gear control spring 50 to give a side pressure to the third cam 22d. That is, the cam gear control spring 50 brakes the second cam gear 22.

As a result, each constituent component including the second cam gear 22 completely stops, and the state A as illustrated in FIG. 6 (pre-release waiting state) is attained.

A modification of the present exemplary embodiment will be described with reference to FIG. 18 to FIGS. 20A and 20B.

Figure 18:
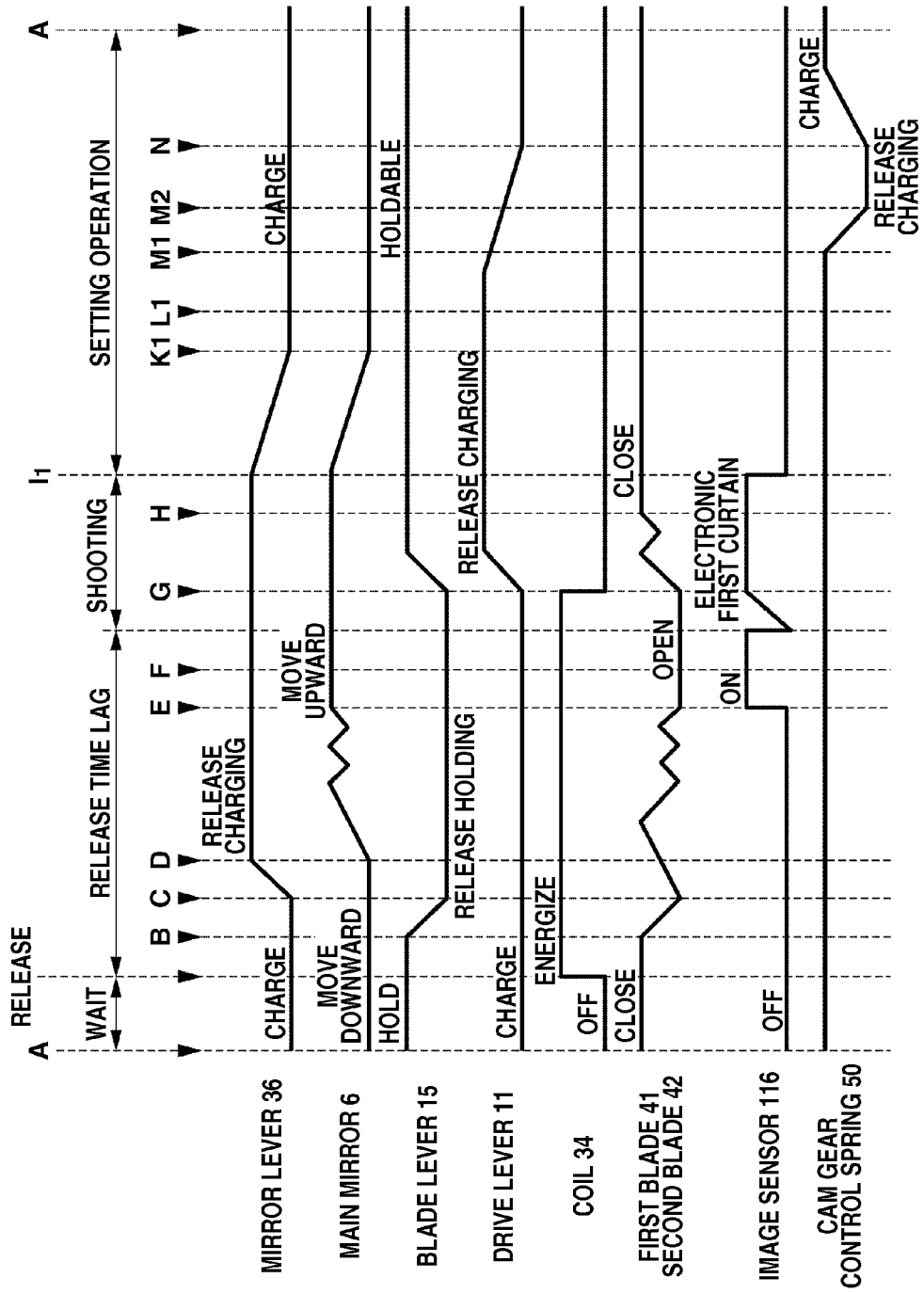
FIG. 18 is a timing chart illustrating operation timing of a mirror lever, a main mirror, a blade lever, a drive lever, a coil, a blade group, an image sensor, and a cam gear control spring according to a modification.

FIG. 18 is a timing chart illustrating operation timing of the mirror lever 36, the main mirror 6, the blade lever 15, the drive lever 11, the coil 34, the blade group, the image sensor 116, and the cam gear control spring 50.

The states A to H as illustrated in FIG. 18 are the same as those of the above exemplary embodiment, and description thereabout is omitted.

Figure 19A:
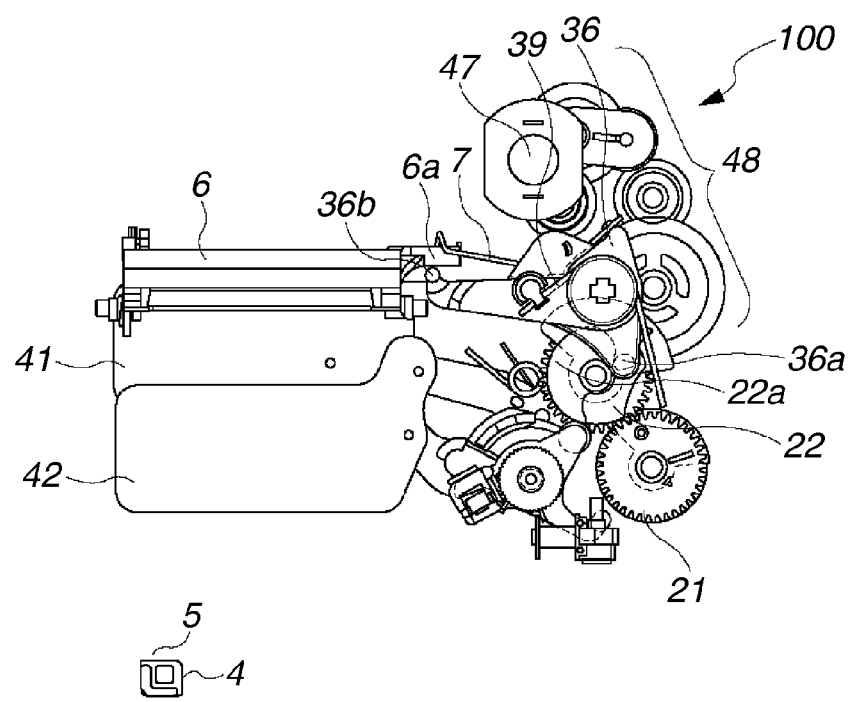
FIGS. 19A and 19B are diagrams illustrating a state of the shutter unit in a mirror lever charge state.
Figure 19B:
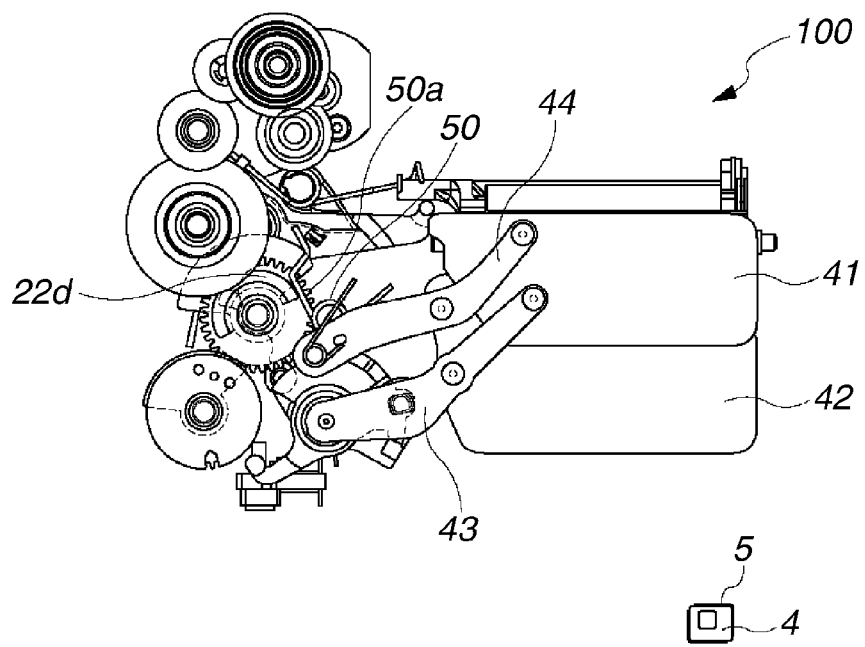

A state I1 as illustrated in FIG. 18 is a mirror lever charge state. FIGS. 19A and 19B illustrate a state of the shutter unit 100 in the mirror lever charge state. FIG. 19A is a diagram illustrating the shutter unit 100 as viewed from the main mirror 6. FIG. 19B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the first cam gear 21 and the second cam gear 22 rotate from the state as illustrated in FIGS. 12A and 12B, the first cam 22a of the second cam gear 22 comes into contact with the cam follower 36a of the mirror lever 36.

When the second cam gear 22 rotates, the first cam 22a of the second cam gear 22 pushes the cam follower 36a of the mirror lever 36. Accordingly, the mirror lever 36 rotates in the counterclockwise direction in FIG. 19A, and the mirror lever 36 charges the mirror lever drive spring 39. When the mirror lever 36 rotates in the counterclockwise direction in FIG. 19A, the main mirror 6 rotates in the downward direction according to urging force applied by a main mirror drive spring 7.

At this occasion, the arm portion 50a of the cam gear control spring 50 comes into contact with the third cam 22d of the second cam gear 22, and the charging operation of the cam gear control spring 50 is completed. This is the only difference from the state I as illustrated in FIG. 6, i.e., the only difference from the mirror lever charge and cam gear control spring charge release start state as illustrated in FIG. 13.

In the mirror lever charge state, the first blade 41 and the second blade 42 stop at the position at which the apertures 1a and 2a are closed, like the blade running completion state.

When the motor 47 is continuously energized in the mirror lever charge state, the first cam gear 21 and the second cam gear 22 further rotate, and a mirror lever charge completion state K1 as illustrated in FIG. 18 is attained.

The state K1 as illustrated in FIG. 18 is the mirror lever charge completion state. FIGS. 20A and 20B illustrate a state of the shutter unit 100 in the mirror lever charge completion state. FIG. 20A is a diagram illustrating the shutter unit 100 as viewed from the main mirror 6. FIG. 20B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the second cam gear 22 further rotates in the counterclockwise direction in FIG. 20A from the mirror lever charge state, the mirror lever 36 charges the mirror lever drive spring 39. As the mirror lever 36 rotates, the main mirror 6 further rotates in the downward direction, comes into contact with the stopper, not illustrated, and then stops. Even after the main mirror 6 stops at the lower position, the second cam gear 22 rotates, and the cam follower 36a of the mirror lever 36 reaches the cam top position 22e of the first cam 22a of the second cam gear 22. At this occasion, as illustrated in FIG. 20A, there is a clearance between the shaft portion 6a of the main mirror 6 and the contact portion 36b of the mirror lever 36. Therefore, even if error occurs in the position of the mirror lever 36, the position of the main mirror 6 is held at the correct position by the stopper, not illustrated.

At this occasion, the arm portion 50a of the cam gear control spring 50 comes into contact with the third cam 22d of the second cam gear 22, and the charging operation of the cam gear control spring 50 is completed. This is the only difference from the state K as illustrated in FIG. 6, i.e., the only difference from the mirror lever charge completion state as illustrated in FIG. 15.

When the motor 47 is continuously energized in the mirror lever charge completion state, the first cam gear 21 and the second cam gear 22 further rotate, so that a blade lever holdable state L1 as illustrated in FIG. 18 is attained.

Figure 21A:
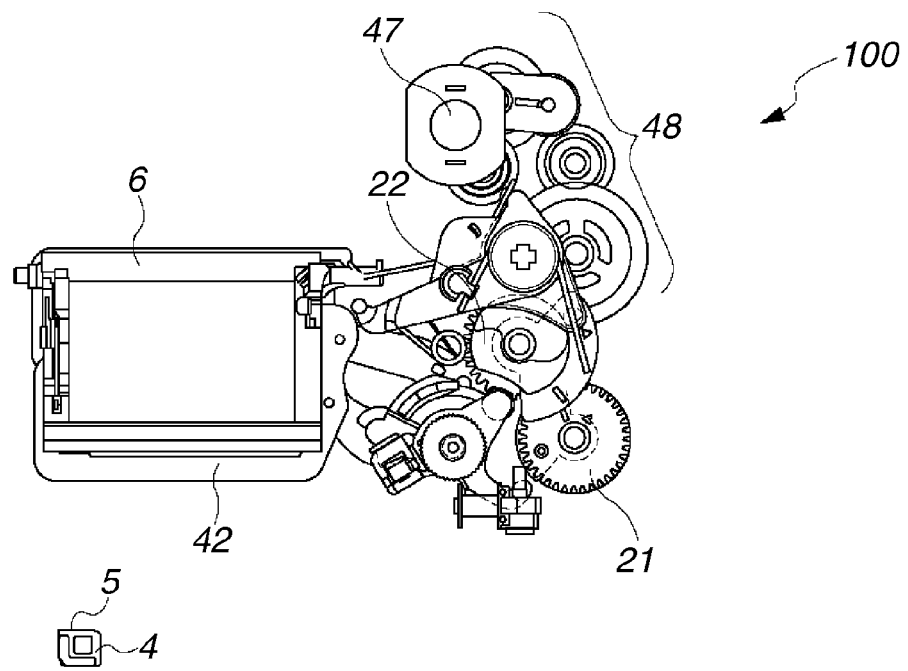
FIGS. 21A and 21B are diagrams illustrating a state of the shutter unit in a blade lever holdable state.
Figure 21B:
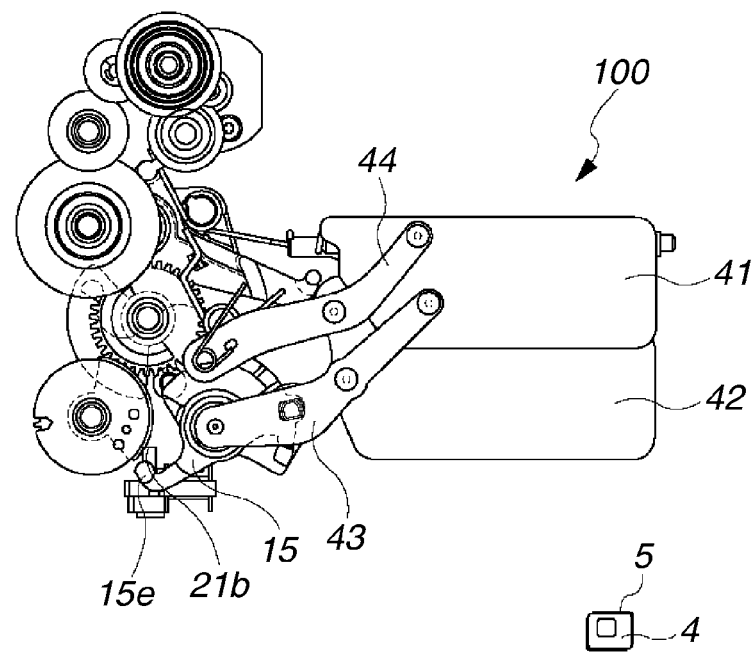

The state L1 as illustrated in FIG. 18 is the blade lever holdable state. FIGS. 21A and 21B illustrate a state of the shutter unit 100 in the blade lever holdable state. FIG. 21A is a diagram illustrating the shutter unit 100 as viewed from the main mirror 6. FIG. 21B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the first cam gear 21 rotates, the cam 21b of the first cam gear 21 moves to a position at which the cam follower 15e of the blade lever 15 can come into contact. In the blade lever holdable state as illustrated in FIGS. 21A and 21B, the urging force applied by the blade drive spring 14 causes the protruding portion 11e of the drive lever 11 to push the protruding portion 15b of the blade lever 15, and therefore, the cam follower 15e of the blade lever 15 is not in contact with the cam 21b of the first cam gear 21

At this occasion, the arm portion 50a of the cam gear control spring 50 comes into contact with the third cam 22d of the second cam gear 22, and the charging operation of the cam gear control spring 50 is completed. This is the only difference from the state L as illustrated in FIG. 6, i.e., the only difference from the blade lever holdable state as illustrated in FIGS. 16A and 16B.

When the motor 47 is continuously energized in the blade lever holdable state, the first cam gear 21 and the second cam gear 22 further rotate, and a drive lever charge and cam gear control spring charge release start state M1 as illustrated in FIG. 18 is attained.

Figure 22A:
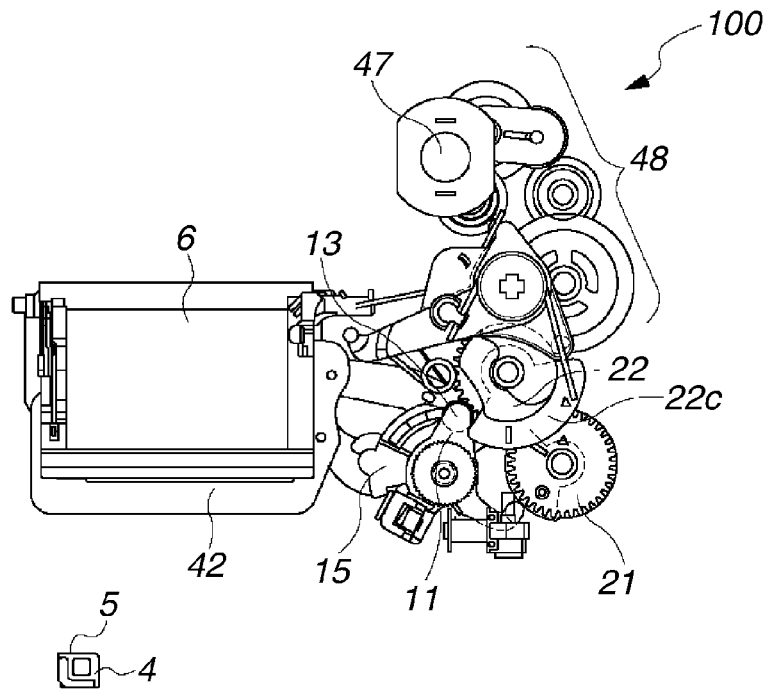
FIGS. 22A and 22B are diagrams illustrating a state of the shutter unit in a drive lever charge and cam gear control spring charge release start state.
Figure 22B:
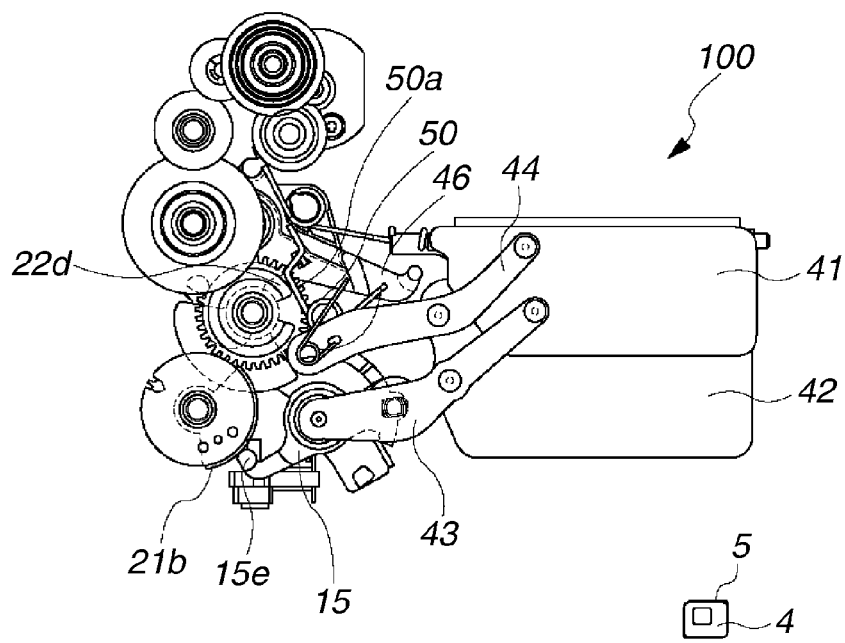

The state M1 as illustrated in FIG. 18 is the drive lever charge and cam gear control spring charge release start state. FIGS. 22A and 22B illustrate a state of the shutter unit 100 in the drive lever charge and cam gear control spring charge release start state. FIG. 22A is a diagram illustrating the shutter unit 100 as viewed from the main mirror 6. FIG. 22B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

When the second cam gear 22 rotates, the second cam 22c of the second cam gear 22 pushes the roller 13 held on the drive lever 11. As a result, the drive lever 11 rotates in the counterclockwise direction in FIG. 22A, and charges the drive spring 14. When the drive lever 11 rotates in the counterclockwise direction in FIG. 22A, the protruding portion 11e of the drive lever 11 and the protruding portion 15b of the blade lever 15 are no longer in contact with each other. Accordingly, the blade lever 15 rotates in the counterclockwise direction in FIG. 22B according to the urging force applied by the blade return spring 46, and the cam follower 15e of the blade lever 15 comes into contact with the cam 21b of the first cam gear 21. As a result, the blade lever 15 is held at the position as illustrated in FIG. 22B, and the first blade 41 and the second blade 42 maintain the apertures 1a and 2a closed.

When the motor 47 is continuously energized in the drive lever charge state, the second cam gear 22 further rotates, so that a cam gear control spring charge release completion state M2 as illustrated in FIG. 18 is attained.

Figure 23A:
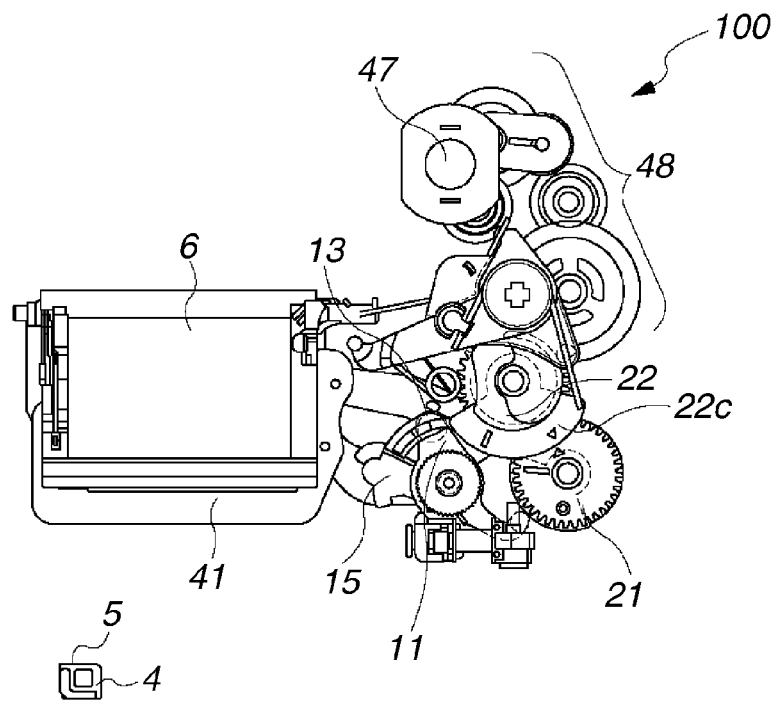
FIGS. 23A and 23B are diagrams illustrating a state of the shutter unit in a cam gear control spring charge release completion state.
Figure 23B:
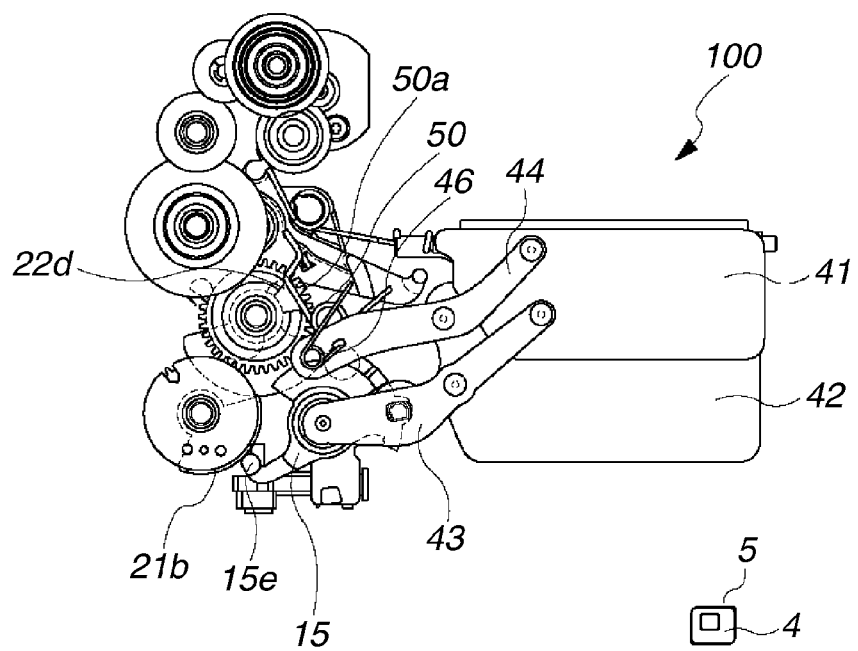

The state M2 as illustrated in FIG. 18 is the cam gear control spring charge release completion state. FIGS. 23A and 23B illustrate a state of the shutter unit 100 in the cam gear control spring charge release completion state. FIG. 23A is a diagram illustrating the shutter unit 100 as viewed from the main mirror 6. FIG. 23B is a diagram illustrating the shutter unit 100 as viewed from the image sensor 116. It should be noted that the shutter base plate 1, the cover plate 2, and the auxiliary base plate 31 are omitted to explain operation of each cam gear and each lever.

The first cam gear 21 and the second cam gear 22 further rotate from the state as illustrated in FIGS. 22A and 22B. As the second cam gear 22 rotates, the first cam 22a of the second cam gear 22 pushes the cam follower 36a of the mirror lever 36. As a result, the mirror lever 36 rotates in the counterclockwise direction in FIG. 23A, and the mirror lever drive spring 39 is charged. When the mirror lever 36 rotates in the counterclockwise direction in FIG. 23A, the main mirror 6 rotates in the downward direction according to the urging force applied by the main mirror drive spring 7.

When this state is attained, charging of the cam gear control spring 50 is completely released, and the cam gear control spring 50 no longer applies any urging force to the second cam gear 22. As a result, the cam gear control spring 50 no longer pushes and supports the rotation of the second cam gear 22.

Further, the motor 47 is energized, so that the first cam gear 21 and the second cam gear 22 rotate with the reduction gear train 48. When the second cam gear 22 further rotates, a drive lever charge completion state N as illustrated in FIG. 18 is attained. The drive lever charge completion state N as illustrated in FIG. 18 is the same as the above embodiment, and description thereabout is omitted.

In the above modification, the cam gear control spring 50 starts to be released while the blade drive spring 14 is charged, and charging of the cam gear control spring 50 is completely released while the blade drive spring 14 is charged. However, the configuration is not limited thereto. From when the blade drive spring 14 starts charging to when the blade drive spring 14 finishes charging, charging of the cam gear control spring 50 may start to be released, and charging of the cam gear control spring 50 may be completely released. In this configuration, the drive force of the motor 47 required to charge the blade drive spring 14 can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-268751 filed Dec. 1, 2010, which is hereby incorporated by reference herein in its entirety.

What is claimed is:

1. A shutter device comprising:
   a shutter plate formed with an aperture through which a photographic light flux passes;
   a shutter blade configured to close and open the aperture, wherein the shutter plate is formed with a first shaft parallel to an optical axis of the photographic light flux;
   a blade lever coupled with the shutter blade;
   a blade return spring configured to urge the blade lever in a direction in which the shutter blade opens the aperture;
   a drive lever configured to drive the blade lever, wherein the drive lever is arranged to rotate around the first shaft;
   a blade drive spring configured to urge the drive lever;
   a charge member configured to charge the blade drive spring, wherein the charge member is arranged to rotate about a second shaft in parallel to the first shaft; and
   a hold member configured to hold the blade lever so that the shutter blade closes the aperture, wherein the hold member is arranged to rotate around a third shaft in parallel to the first shaft,
   wherein, in a case when the blade drive spring is charged, the hold member switches whether the hold member holds the blade lever regardless of the drive lever,
   wherein the charge member and the hold member are coupled with each other directly so that the charge member and the hold member rotate in same speed.

2. The shutter device according to claim 1,
   wherein the second shaft is formed at a position that is far from the aperture than the first shaft,
   wherein the third shaft is formed at a position that is far from the aperture than the second shaft, and
   wherein a triangle formed by connecting the first shaft, the second shaft, and the third shaft is an acute-angled triangle.

3. The shutter device according to claim 1,
   wherein the charge member is formed with a first gear portion,
   wherein the hold member is formed with a second gear portion having the same number of teeth as that of the first gear portion, and
   wherein the first gear portion and the second gear portion are in mesh with each other.

4. The shutter device according to claim 3, further comprising:
   a detection unit configured to detect a rotational position of the hold member.

5. The shutter device according to claim 1, further comprising:
   a rotation control spring configured to control rotation of the charge member,
   wherein the rotation control spring is arranged to suppress the rotation of the charge member according to a rotational position of the charge member, and
   wherein the rotation control spring is arranged to push and support the rotation of the charge member according to the rotational position of the charge member.

6. The shutter device according to claim 5,
   wherein the rotation control spring is arranged to push and support the rotation of the charge member while the charge member charges the blade drive spring.

7. The shutter device according to claim 5,
   wherein the charge member is formed with a charge cam portion and a control cam portion,
   wherein in a case when the charge member charges the blade drive spring, the charge cam portion comes into contact with the drive lever,
   wherein the control cam portion is located closer to the shutter plate than the charge cam portion, and
   wherein the rotation control spring is arranged to come into contact with the control cam portion.

8. An imaging apparatus comprising:
   an image sensor; and
   the shutter device according to claim 1 configured to adjust an amount of exposure on the image sensor.

9. A shutter device according to claim 1, further comprising:
   a motor; and
   a transmitting means configured to transmit drive force of the motor to the charge member,
   wherein the drive force of the motor transmits to the hold member via the charge member.

* * * * *